(12) United States Patent
Shimono et al.

(10) Patent No.: US 12,270,761 B2
(45) Date of Patent: Apr. 8, 2025

(54) FLUORESCENCE MEASURING DEVICE

(71) Applicants: Shoreline Science Research, Inc., Tokyo (JP); Kenichi Masui, Tokyo (JP)

(72) Inventors: Akio Shimono, Tokyo (JP); Toshihide Hikida, Tokyo (JP); Takahiro Goto, Tokyo (JP); Asao Mizoguchi, Tokyo (JP); Kenichi Masui, Tokyo (JP)

(73) Assignees: Shoreline Science Research, Inc., Tokyo (JP); Kenichi Masui, Tokyo (JP)

( * ) Notice: Subject to any disclaimer, the term of this patent is extended or adjusted under 35 U.S.C. 154(b) by 241 days.

(21) Appl. No.: 17/996,348

(22) PCT Filed: Mar. 18, 2022

(86) PCT No.: PCT/JP2022/012913
§ 371 (c)(1),
(2) Date: Oct. 16, 2022

(87) PCT Pub. No.: WO2022/202723
PCT Pub. Date: Sep. 29, 2022

(65) Prior Publication Data
US 2023/0204509 A1    Jun. 29, 2023

(30) Foreign Application Priority Data
Mar. 26, 2021   (JP) .................. 2021-054005

(51) Int. Cl.
*G01N 21/64*   (2006.01)
*G01J 1/44*   (2006.01)
*G01N 21/65*   (2006.01)

(52) U.S. Cl.
CPC ............ *G01N 21/6402* (2013.01); *G01J 1/44* (2013.01); *G01N 21/65* (2013.01); *G01J 2001/442* (2013.01); *G01J 2001/444* (2013.01)

(58) Field of Classification Search
CPC .. G01J 1/44; G01J 2001/442; G01J 2001/444; G01J 3/4406; G01N 21/6402;
(Continued)

(56) References Cited

U.S. PATENT DOCUMENTS 5,185,265 A   2/1993 Steen
5,186,173 A   2/1993 Zuckerman
(Continued)

FOREIGN PATENT DOCUMENTS

JP   S51-94886 A   8/1976
JP   S58-211631 A  12/1983
(Continued)

OTHER PUBLICATIONS

Rae et al. ("A Vertically Integrated CMOS Microsystem for Time-Resolved Fluorescence Analysis", IEEE Transactions on Biomedical Circuits and Systems, vol. 4, Issue 6, 2010, pp. 437-444) (Year: 2010).*
(Continued)

*Primary Examiner* — Hina F Ayub
(74) *Attorney, Agent, or Firm* — Muncy, Geissler, Olds & Lowe, P.C.

(57) ABSTRACT

[Problem to be Solved]
Provided is a fluorescence measuring device that suppresses or eliminates fluctuations in a light source, problems of jitter associated with signal processing, and the influence of background light and performs highly sensitive and accurate quantification even when it is difficult to separate fluorescence from scattered light due to time difference or wavelength difference.
[Solution] The fluorescence measuring device includes a continuous light source 2, an excitation light irradiation unit 3, an excitation light intensity detection unit 4, a photon counting type fluorescence detection unit 5, a rectangular
(Continued)

wave modulation circuit 6 of the continuous light source, a timing circuit 7 that generates a rectangular wave pulse to be supplied to the rectangular wave modulation circuit and a gate pulse for signal processing, a gate counter circuit 8 that counts fluorescence photon pulse signals during the gate pulse period, a physical parameter information acquisition unit 9, and a concentration calculator 10. By digitally processing digital signals with this configuration and accurately digitally calculating and subtracting the current background photon count conversion value, it is possible to perform highly sensitive and highly accurate quantification by appropriately removing the influence of the background.

7 Claims, 8 Drawing Sheets

(58) Field of Classification Search
CPC .. G01N 21/6408; G01N 21/645; G01N 21/65; G01N 2201/0625
See application file for complete search history.

(56) References Cited

U.S. PATENT DOCUMENTS

| | | | |
|---|---|---|---|
| 5,462,879 | A | 10/1995 | Bentsen |
| 2005/0153356 | A1 | 7/2005 | Okawa et al. |
| 2010/0163748 | A1 | 7/2010 | Dhadwal |
| 2013/0234045 | A1 | 9/2013 | Maeda |
| 2019/0242864 | A1 | 8/2019 | Stevens |
| 2021/0018438 | A1* | 1/2021 | Tsuruoka ............ G01J 3/36 |

FOREIGN PATENT DOCUMENTS

| | | |
|---|---|---|
| JP | H06-503487 A | 4/1994 |
| JP | H07-18757 B | 3/1995 |
| JP | H08-304283 A | 11/1996 |
| JP | H09-503866 A | 4/1997 |
| JP | H09-159527 A | 6/1997 |
| JP | 2004-101354 A | 4/2004 |
| JP | 2005-207955 A | 8/2005 |
| JP | 2012-68146 A | 4/2012 |
| JP | 2012-93190 A | 5/2012 |
| JP | 2019-533172 A | 11/2019 |

OTHER PUBLICATIONS

Hamamatsu Photonics K.K., Photomultiplier Tube Handbook, Photomultiplier Tubes, Its Basics and Applications, 4th Edition.
Kavier Michalet et al, Silicon Photon-Counting Avalanche Diodes for Single-Molecule Fluorescence Spectroscopy, IEEE Journal of Selected Topics in Quantum Electronics, Sep. 1, 2014.
English Translation of International Search Report for the International Patent Application No. PCT/JP2022/012913 mailed May 10, 2022.
Written opinion for the International Patent Application No. PCT/JP2022/012913 mailed May 10, 2022.

* cited by examiner

[FIG. 1]
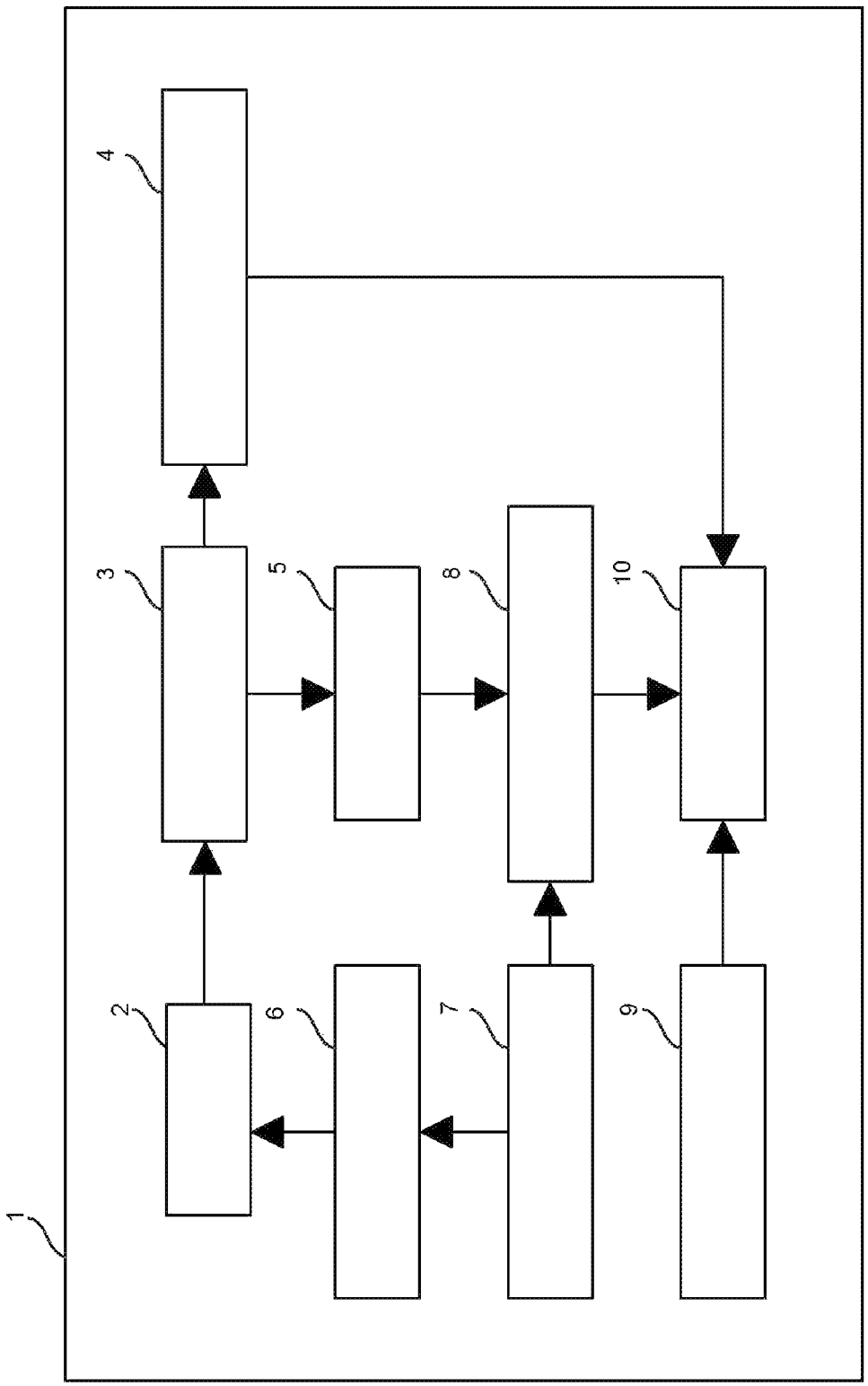

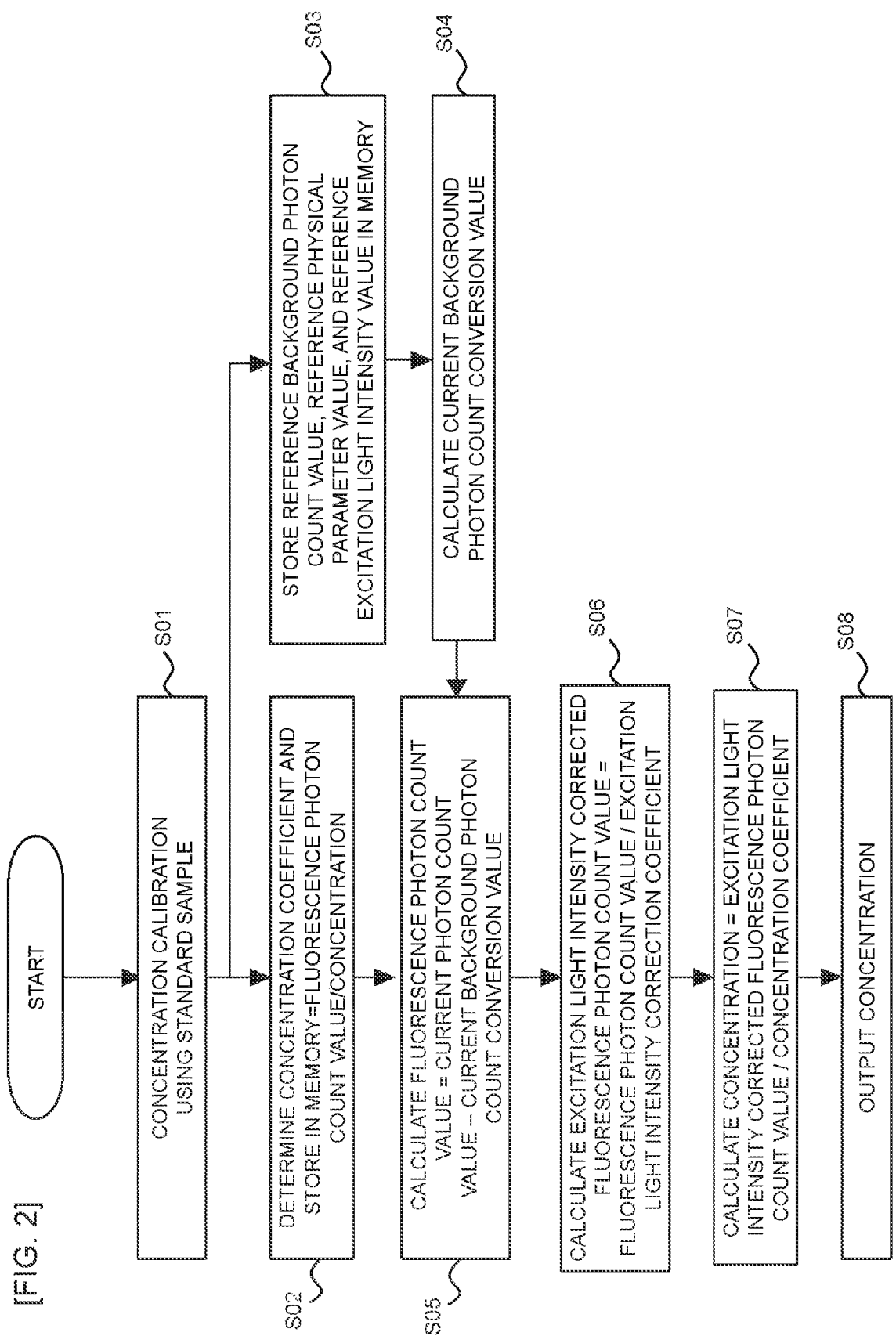

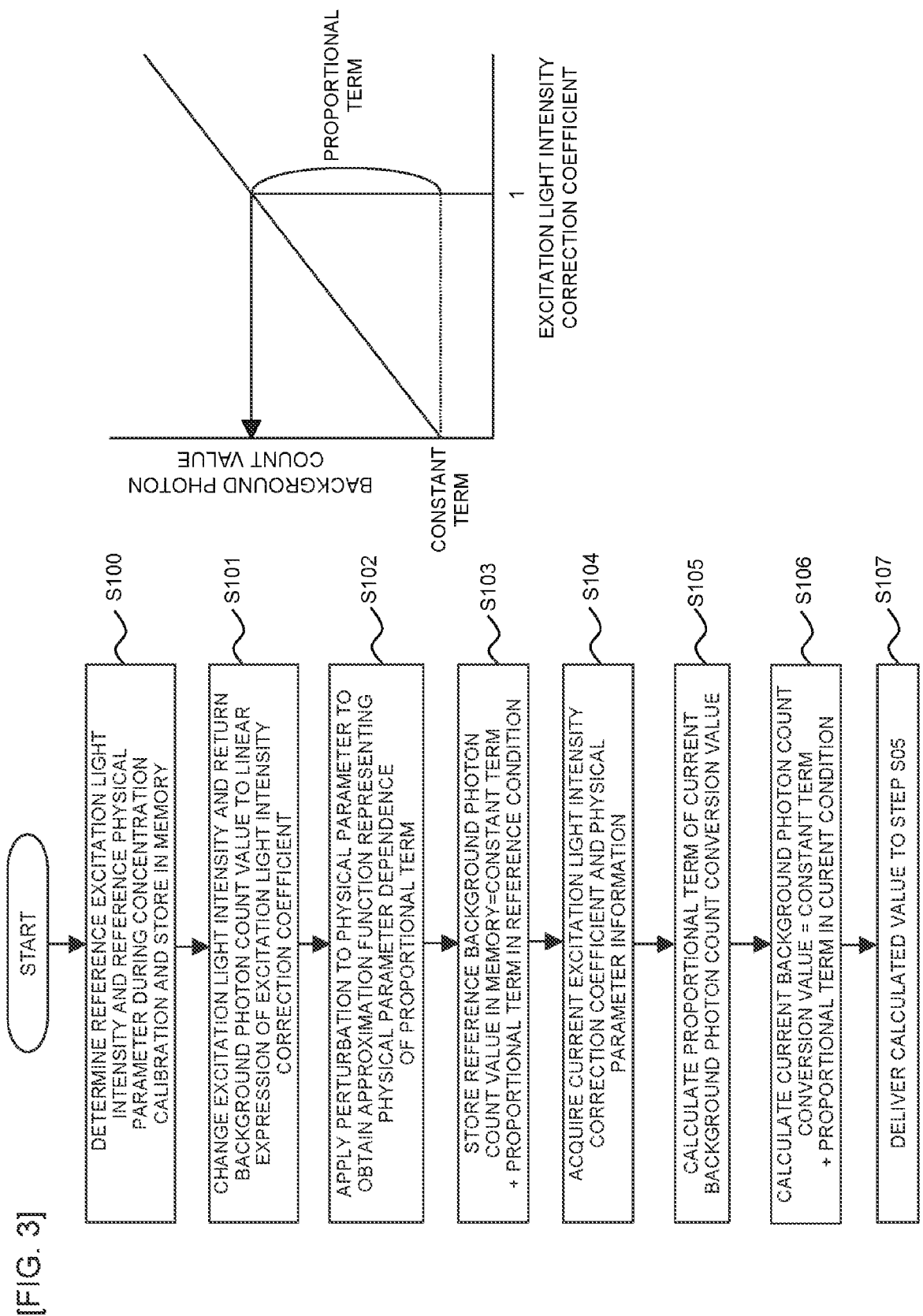
[FIG. 3]

[FIG. 4]
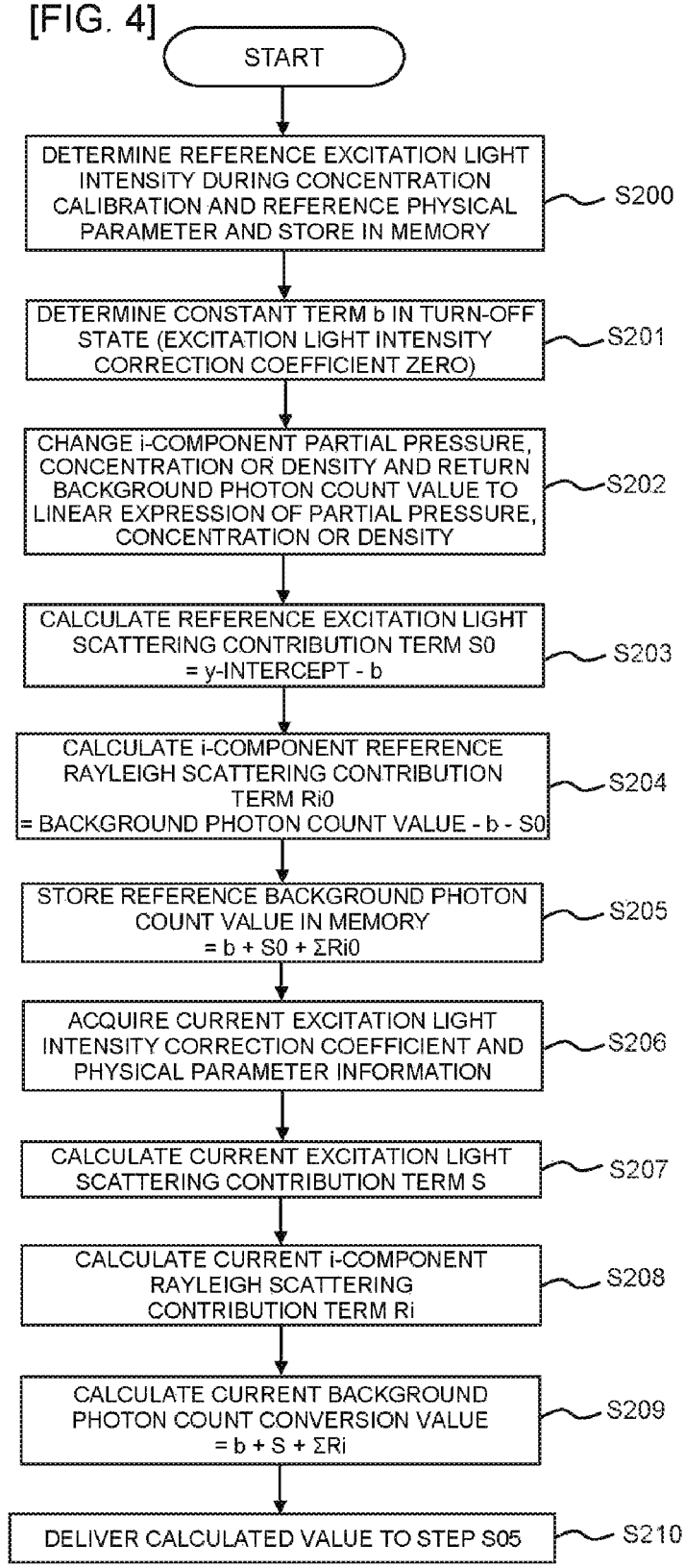
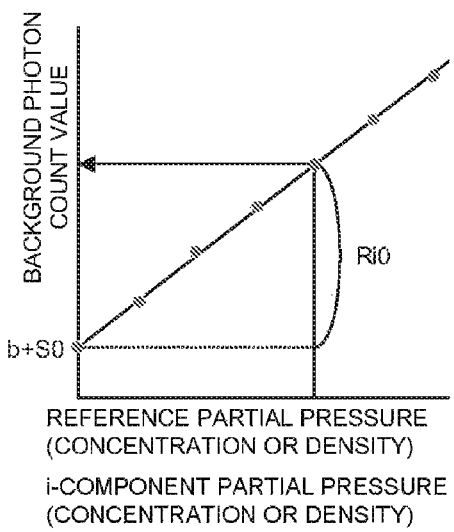

[FIG. 5]
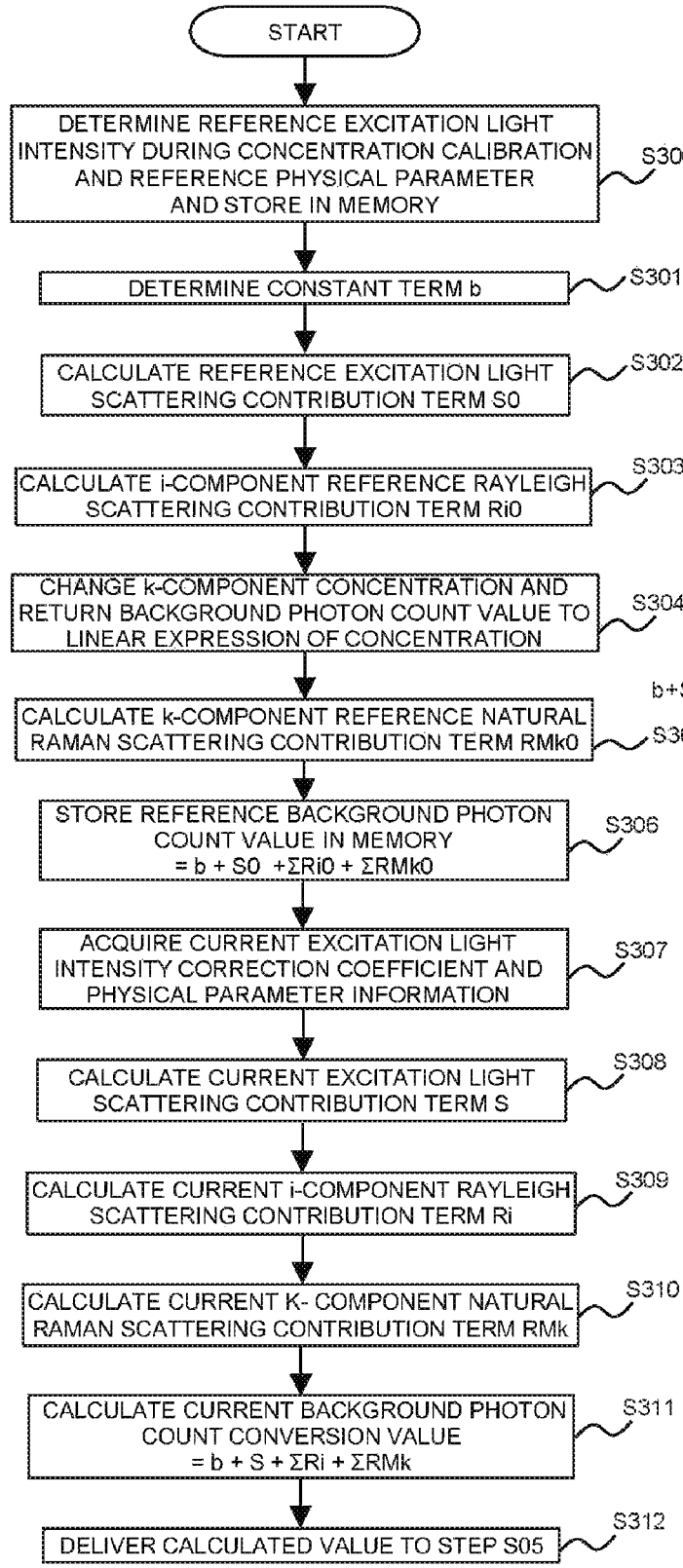
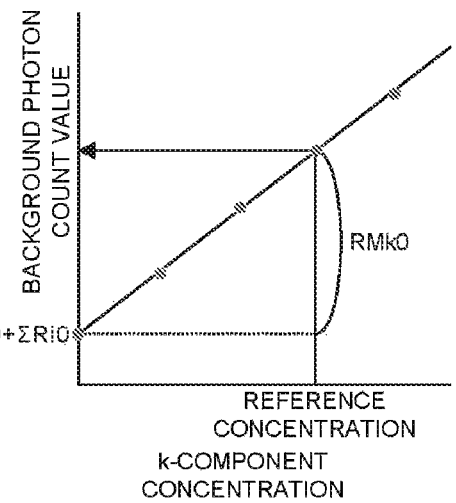

[FIG. 6]
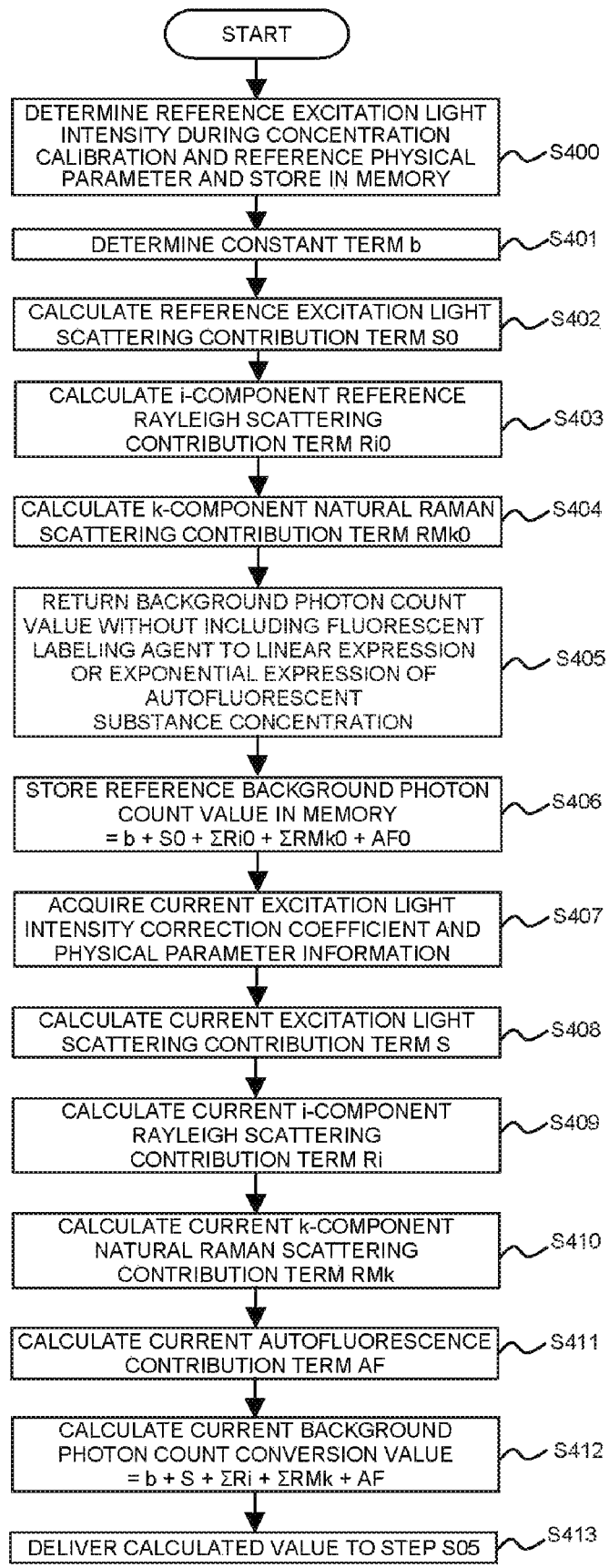
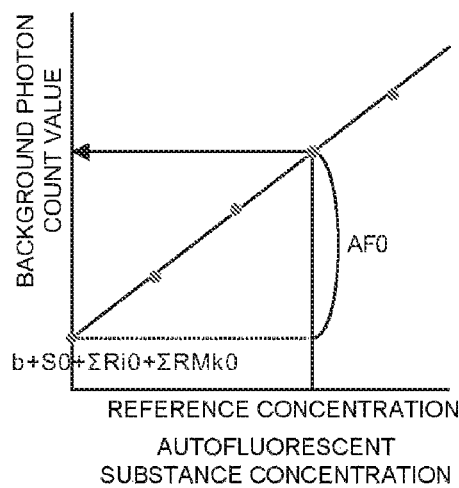

[FIG. 7]
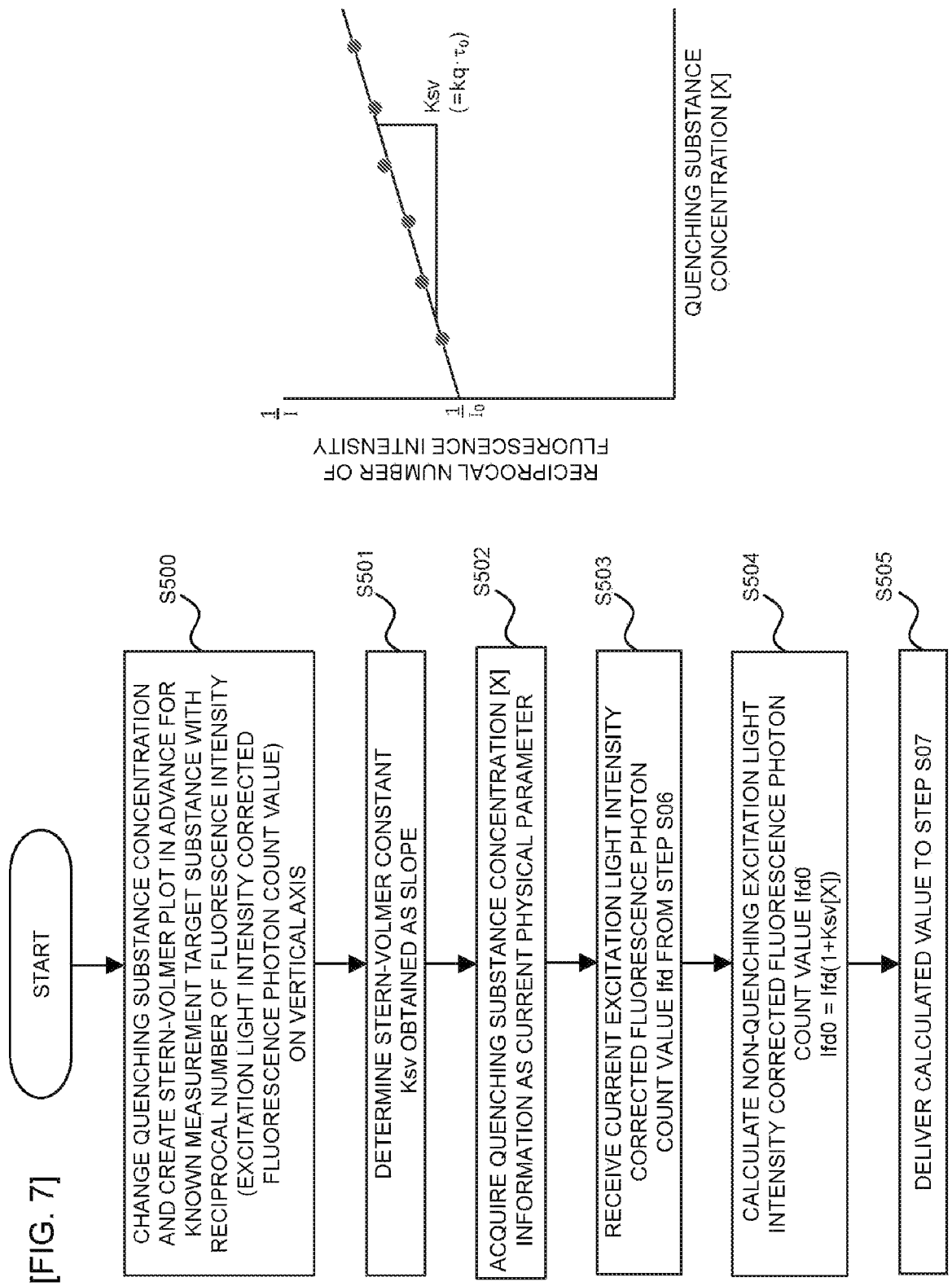

FLUORESCENCE MEASURING DEVICE

TECHNICAL FIELD

The present invention relates to a fluorescence measuring device capable of measuring the fluorescence emitted by a very small amount of a substance and performing highly accurate quantification.

BACKGROUND ART

Fluorescence spectroscopy, which obtains molecular information on a substance by measuring the fluorescence emitted when the substance absorbs light of a specific wavelength and is electronically excited and returns from a singlet excited state to the ground state is used as a conventional analysis method in scientific research centered on the field of biochemistry that uses fluorescent labels and fluorescent dyes. In addition, a fluorescence detector is used as a selective and highly sensitive detector for a liquid chromatograph device or a capillary electrophoresis device, which is important as an analysis method for liquid samples, regardless of whether it is for research or industrial use. However, in a general industrial field, there are few examples in the analysis targeting particularly dilute gaseous substances compared to absorption spectroscopy, and sulfur dioxide analyzers installed in exhaust gas treatment systems in combustion facilities and the like are generally used. One of the causes thereof is that fluorescence spectroscopy measures weaker light than absorption spectroscopy, so a high-intensity light source is required to excite many molecules in order to obtain stronger fluorescence, and the light source is limited to lasers and xenon lamps of specific wavelengths. In addition, in order to increase the probability of transition to the electronically excited state, it is common to use pulsed light in which the energy of light is condensed in a short time, but this has problems of not only fluctuation in intensity from shot to shot, but also fluctuation in time position of pulsed light oscillation called jitter.

As a method for improving a decrease in an SN ratio due to the fluctuation of the light source described above, in a typical example of the prior art, a semitransparent mirror is placed in front of a place where excitation light enters a cell, and the reflected light is reflected by a detector such as a photodiode. Since the reflected light intensity is proportional to the light intensity of the light source, the output value from the fluorescence detector is divided by the output value from the reflected light detector to compensate for the light source fluctuation. This method has a problem that it is affected by fogging of an incidence window where the excitation light is incident on the cell. JP, A, 51-94886 is provided with an optical trap that collects the excitation light incident on the cell and guides it to an end and compensation is made by the output of the detector placed at the end. In JP, A, 8-304283 related to a fluorometer, the output of a detector that receives a part of the excitation light from a discharge lamp such as a xenon lamp is further integrated by an integrator, and the obtained output is used to correct the fluorescence intensity. JP, A, 58-211631, which uses a pulse laser as a light source, also discloses a similar correction method. However, even if such correction of the light source intensity is performed, the influence cannot be sufficiently eliminated because the intensity fluctuation unique to the pulse oscillation light source is large, and the fluctuation of the fluorescence signal intensity due to the fluctuation of the light source intensity is normally about 5%.

Laser-induced fluorescence methods or laser fluorescence methods using pulse lasers, which are often used to visualize the combustion state of an engine, typically use a pulse generator or timing circuit that generates a plurality of pulse trains with different delay times to trigger the oscillation of lasers. In the fluorescence detection system, a pre-amplifier is connected to a photomultiplier tube, the DC current component of the repetitive optical signal generated by the fluorescence transition of a substance in response to pulsed light oscillation is integrated with a boxcar integrator or a gate integrator circuit using a pulse train with a certain delay time from laser oscillation as a trigger to extract a weak signal buried in noise, the voltage output is A/D-converted and is taken into the CPU or microprocessor to calculate the substance concentration. Also, in the case of a sulfur dioxide analyzer, signal processing is performed by an analog circuit. Therefore, even if an attempt is made to construct a highly sensitive measuring device, a remarkably low DC level is detected for extremely weak light, and there is a problem that the sensitivity is inevitably insufficient. Further, in the combination of the pulse laser and the analog gate integration system, the fluctuation of the time axis in the signal processing, that is, the jitter is a big problem even if the same pulse generator is used.

Instead of a fluorescence signal processing system composed of an analog circuit, the DC current component of the output from the photomultiplier tube is converted into a voltage and amplified, and instead of a fluorescence signal detection system composed of an analog circuit, a photon measuring method of directly counting pulse signals from the photomultiplier tube to convert it into a photon count (in this case, particularly called a photon counting system) is effective for measuring extremely weak light. However, when strong light is received, the pulse signal does not statistically correspond to an event of one photon, and the event corresponding to the event of a plurality of photons appears. Thus, it is not more common than the DC component measurement system because of the narrow dynamic range in which the count value is saturated according to the light reception intensity.

Regarding the photon count metering device, the device disclosed in JP, A, 7-18757 includes both a photon counting circuit and a DC component measuring circuit, discriminates the pulse signal of the photomultiplier tube by the wave height, and switches between the two circuits according to the wave height to expand the dynamic range is expanded, but the switching is performed manually. In the photodetection circuit and detector disclosed in JP, A, 2005-207955, when it is determined that the amount of light incident on the photocathode of the photomultiplier tube is larger than a predetermined amount, the photon counting system is switched to the analog output system, the two adjacent diodes are put into the same potential according to the amount of incident light on the photocathode, and the dynamic range is expanded by controlling the multiplication of secondary electrons.

In JP, A, 9-159527, the magnification of a detector in which an avalanche photodiode is more preferable in a time region in which a fluorescence signal excited by pulsed light is dominant is increased than in a time region in which the fluorescence signal is not dominant to suppress the influence of sound control layer so that a very small amount of substance is measured with high accuracy. However, it is difficult to suppress the influence of scattered light by this method because the decay time of scattered light is close to the fluorescence lifetime of a substance having a short fluorescence lifetime.

As described in Hamamatsu Photonics K.K., "Photomultiplier Tube Handbook (Photomultiplier Tubes, Its Basics and Applications, 4th Edition)", a photon counting head in which a high voltage power supply circuit, a voltage dividing circuit, a photomultiplier tube and a photon counting circuit are integrated into one module for the application of the photon counting system has become widespread. Some photon counting heads have a built-in gate circuit, but there are restrictions on high speed and high repeatability.

SUMMARY OF INVENTION

Technical Problem

In order to use fluorescence spectroscopy for highly sensitive detection of very small amounts of substances, it is said that the use of a photomultiplier tube of the photon counting system is effective, and the technique of expanding the dynamic range is described in Patent Literatures 4 and 5 and the like. However, the problem of dynamic range limitation is emphasized in some applications such as fluorometers. In many potential industrial applications, the required dynamic range is within about 4 to 5 digits. This dynamic range is sufficient in the range of linearity of the pulse signal output (that is, response) proportional to the number of photons incident on the photocathode obtained by a photomultiplier tube. The problem of limiting the industrial use of fluorescence spectroscopy lies in another point. The problem is that it is premised on the use of a pulsed light source such as a high-power pulse laser for fluorescence excitation. Since the pulse laser compresses very high energy into a short-time pulse, fluctuations in intensity, fluctuations in pulse width, and jitter of pulse oscillation cannot be ignored, and even if it is highly sensitive, a lot of additional technology is required to achieve high accuracy. The available wavelength band of pulse lasers is limited, and the equipment is large and expensive. Furthermore, since it oscillates with a high amount of light instantaneously, a means for separating the scattered light from fluorescence in the detection region of the excitation light in the main time region or the wavelength region is absolutely necessary. However, there is a problem that separation becomes difficult with a substance having a short fluorescence lifetime or a substance having a small wavelength difference between excitation light and fluorescence, that is, a small stokes shift. Patent Literature 1, Patent Literature 2, Patent Literature 3, and the like disclose methods for correcting the influence of fluctuation of the intensity of the pulsed light source on the fluorescence intensity, and Patent Literature 3 and the like disclose methods for suppressing the influence of scattered light when using the pulsed light source. However, even when such correction is performed, the influence could not be sufficiently eliminated because the intensity fluctuation unique to the pulse oscillation light source is large, and even though it is a highly sensitive method, it is not a highly accurate quantification method. Further, in the prior art, it is not possible to quantitatively evaluate the influence of the background light and make an appropriate correction. The cause is that the background light itself is not analyzed in detail in the first place and that the signal processing is an analog system, it is difficult to install an arithmetic expression for eliminating the influence of background light.

An object of the present invention is to provide a fluorescence measuring device that suppresses or eliminates fluctuations in a light source, problems of jitter associated with signal processing, and the influence of background light and performs highly sensitive and accurate quantification even when it is difficult to separate fluorescence from scattered light due to time difference or wavelength difference.

Solution to Problem

In order to solve the above problems, the present invention has characteristic such that: a continuous light source that generates excitation light of a measurement target substance; an excitation light irradiation unit that introduces a sample and irradiates the excitation light from the continuous light source; an excitation light intensity detection unit that detects the amount of light proportional to the excitation light intensity and converts the amount of light into a digital signal; a fluorescence detection unit that detects fluorescence emitted by the measurement target substance by a photon counting system; a rectangular wave modulation circuit that modulates the continuous light source with a rectangular wave corresponding to turn-on and turn-off states; and a timing circuit that generates a rectangular wave pulse to be supplied to the rectangular wave modulation circuit and a gate pulse for signal processing by the same clock; a gate counter circuit that counts a pulse signal corresponding to one photon from the fluorescence detection unit during a period of the gate pulse within a predetermined period; a physical parameter information acquisition unit that acquires a current physical parameter value required for calculating the concentration of the measurement target substance; and a concentration calculator that subtracts a current background photon count conversion value from a current photon count value obtained from the gate counter circuit to obtain a fluorescence photon count value excluding the influence of background, divides the obtained fluorescence photon count value by an excitation light intensity correction coefficient represented as a ratio between a current excitation light intensity measurement value measured by the excitation light intensity detection unit and a reference excitation light intensity value measured during concentration calibration to calculate an excitation light intensity corrected fluorescence photon count value, and further divides the excitation light intensity corrected fluorescence photon count value by a concentration coefficient of the measurement target substance represented as a fluorescence photon count value per concentration obtained during the concentration calibration to digitally calculate the concentration of the measurement target substance, wherein the background photon count conversion value in the concentration calculator is calculated using a reference background photon count value and a related reference physical parameter value measured with a sample that does not contain the measurement target substance during the concentration calibration stored in advance assuming that the background photon count conversion value is a linear combination of a constant term that does not depend on the excitation light intensity correction coefficient and a proportional term that is proportional to the excitation light intensity correction coefficient, and the current physical parameter value and the current excitation light intensity correction coefficient acquired by the physical parameter information acquisition unit.

Advantageous Effects of Invention

According to the fluorescence measuring device of the present invention configured as described above, it is possible to precisely and accurately quantify a measurement target substance with high sensitivity that can detect a very small amount of substance without requiring frequent calibration.

Moreover, the present invention can provide a low-cost and compact fluorescence measuring device since it is mainly configured of digital signal processing using a relatively inexpensive continuous light source without necessarily requiring high coherence of the light source.

BRIEF DESCRIPTION OF DRAWINGS

FIG. 1 is a conceptual configuration diagram showing an example of a fluorescence measuring device according to an embodiment.

FIG. 2 is a flow chart showing an example of a calculation method in a concentration calculator constituting the fluorescence measuring device according to the embodiment.

FIG. 3 is a flow chart showing an example of the procedure 1 for calculating a background photon count conversion value in the concentration calculator according to the embodiment.

FIG. 4 is a flow chart showing an example of the procedure 2 for calculating a background photon count conversion value in the concentration calculator according to the embodiment.

FIG. 5 is a flow chart showing an example of the procedure 3 for calculating a background photon count conversion value in the concentration calculator according to the embodiment.

FIG. 6 is a flow chart showing an example of the procedure 4 for calculating a background photon count conversion value in the concentration calculator according to the embodiment.

FIG. 7 is a flow chart showing an example of a concentration calculation method in the concentration calculator according to the embodiment when a quenching substance of a measurement target substance is present in the sample.

DESCRIPTION OF EMBODIMENTS

Figure 8:
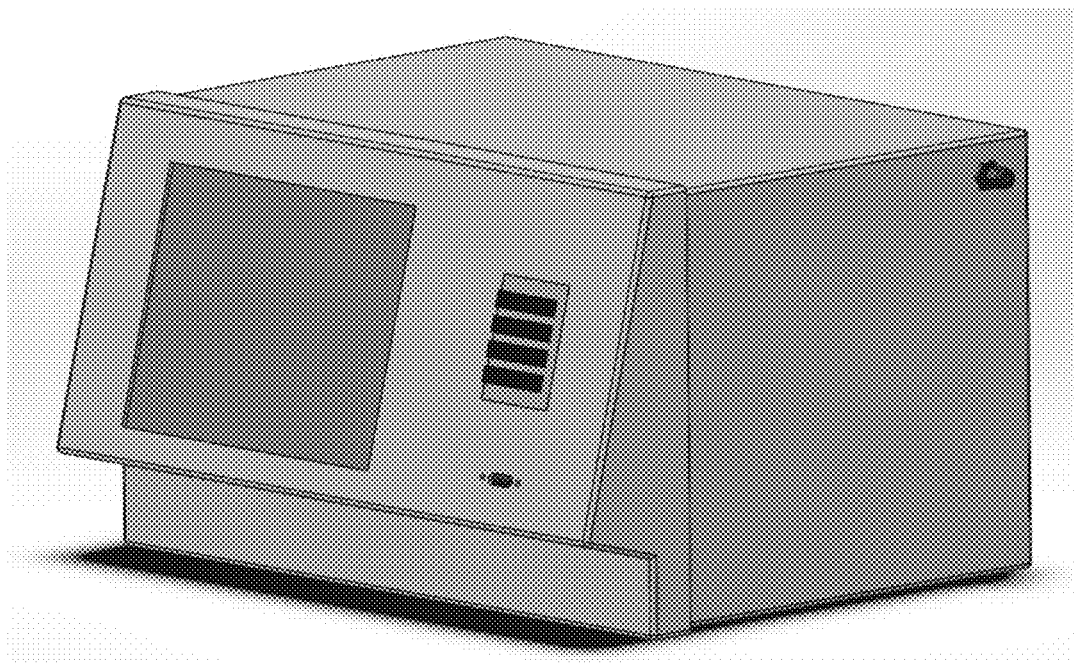
FIG. 8 is a perspective view illustrating the fluorescence measuring device according to the embodiment.

A continuous light source of the present invention refers to a light source capable of emitting stable continuous light, and is generally also referred to as a CW light source. In the case of the present invention, the continuous light source is used with rectangular wave modulation at a frequency higher than the oscillation frequency of a general pulse laser. Typically, it is referred to as a continuous light source from the original emission form in order to distinguish it from the original pulse oscillation light source such as a YAG laser-excited dye laser. When a plurality of excitation wavelength bands are used by switching in time, the number of continuous light sources may be plural.

The measurement target substance of the present invention refers to a substance which emits fluorescence due to excitation light from a light source and exists in a sample whose medium is a gas or liquid. Typically, when the medium is a gas, it is a substance existing in a gaseous state, and when the medium is a liquid, it is a substance existing in a liquid state, but the medium may be a gas or a liquid, and it may exist as fine particles or minute aggregates. Even if the measurement target substance itself does not emit fluorescence or has weak fluorescence, the product or modified product may emit fluorescence due to the reaction with a fluorescent probe, a fluorescent labeling agent or a fluorescent dyeing agent, and the fluorescence of the product or modified product may be measured. In addition, when a plurality of excitation wavelength bands of a continuous light source are used by switching, the number of measurement target substances may be the same as the number of excitation wavelength bands, and interfering substances that are not the measurement target substances but emit fluorescence are also included in the measurement target substances.

The photon counting system of the present invention is synonymous with a photon measuring system and refers to a system capable of realizing the photon measuring method. Here, the photon counting system, the photon counting system and the photon measuring method are treated as synonymous without any particular distinction.

In order to distinguish from the gate pulse, the rectangular wave pulse of the present invention refers only to the rectangular wave pulse generated by a timing circuit for modulating a continuous light source with the rectangular wave. When a plurality of excitation wavelength bands of a continuous light source are used by switching in time, the same number of different rectangular wave pulses corresponding to the excitation wavelength bands are generated.

The gate pulse of the present invention refers to a rectangular wave pulse generated by a timing circuit for applying a gate in the signal processing of a gate counter circuit, and is referred to as a gate pulse for distinction. When a plurality of excitation wavelength bands of a continuous light source are used by switching, the same number of different gate pulses corresponding to the rectangular wave pulses, that is, corresponding to the excitation wavelength bands are generated.

The gate counter of the present invention is defined for the purpose of contrasting with the analog signal gate integration system represented by a boxcar integrator. The gate counter refers to a system in which a pulse signal corresponding to one photon input from a fluorescence detection unit of a photon counting system is counted by a counter for a period in which the gate pulse generated by the timing circuit is applied, and integration is performed within a predetermined period. Since it is calculated by a digital circuit, it can be said to be a digital gate integration system.

The background of the present invention refers to a bias component obtained by removing fluorescence from a signal generally also called background light. The background includes unnecessary light generally called stray light, a dark count which is noise thermally generated by the fluorescence detection unit, Rayleigh scattered light due to major component substances other than the measurement target substance contained in the medium of the sample, and natural Raman scattered light due to the component with strong Raman activity when the sample contains a large amount of the components with strong Raman activity. The measurement target substance itself is a substance that does not emit fluorescence or has weak fluorescence. The background includes autofluorescence due to the measurement target substance or the substance containing the measurement target substance when the product or modified product emits fluorescence due to a reaction with a fluorescent probe, a fluorescent labeling agent, or a fluorescent dyeing agent, and the fluorescence of the product or modified product is measured, that is, when the measurement target substance is fluorescently labeled and the fluorescence of the fluorescently labeled product is measured. Further, in general, a particulate component in the medium has been removed in advance or has undergone a treatment so as not to be affected, so that it may be treated as not including Mie scattering. Stray light includes indoor light, scattered light of excitation light due to reflection and refraction outside an excitation light irradiation unit, and scattered light of excitation light due to reflection and refraction inside the excitation light irradiation unit. Since the structure of the excitation light irradiation unit is devised so that the indoor light and the scattered light of the excitation light due to the reflection and refraction outside the excitation light irradiation unit do not enter, although the scattered light of the excitation light due to the reflection and refraction inside the excitation light irradiation unit is the main component, this can be reduced by devising an internal structure such that these components do not reach the fluorescence detection unit. The scattered light and Rayleigh scattered light of the excitation light due to the reflection and refraction inside the excitation light irradiation unit have a long fluorescence lifetime, and can be first separated in time when a delay gate is applied to acquire a fluorescence signal after the continuous light source is turned from on to off. However, in reality, the fluorescence lifetime is short and it is not possible to separate them in time, or even if they can be separated, the load cycle is very small and satisfactory sensitivity cannot be obtained in many cases. Even when the wavelength of the fluorescence spectrum extends sufficiently toward the longer wavelength side than the wavelength of the excitation light, when the scattered light and Rayleigh scattered light of the excitation light due to reflection and refraction inside the excitation light irradiation unit and the fluorescence are separated by wavelength using a spectroscopic element such as a spectroscope, the actual fluorescence collection efficiency is very low. Even when a bandpass filter or the like is used instead of the spectroscope, even if it is possible to separate them in terms of the center wavelength and the full width at half maximum of the bandpass filter, the base of the transmission spectrum is wide when viewed in the order of % or less, it is not possible to completely block the scattered light and Rayleigh scattered light of the excitation light due to the reflection and refraction inside the excitation light irradiation unit, and it cannot be ignored in the measurement of trace concentrations. When an LED is used as a continuous light source instead of a monochromatic laser, the excitation wavelength itself has a width as a result, and the skirt on the long wavelength side of the excitation wavelength band overlaps with the fluorescence wavelength. Thus, the influence of the scattered light and the Rayleigh scattered light of the excitation light due to the reflection and refraction inside the irradiation unit becomes large. The natural Raman scattered light is weak and can be ignored in the case of a gas. However, in the case of a liquid sample, when the influence of the scattered light and the Rayleigh scattered light of the excitation light due to the reflection and refraction inside the excitation light irradiation part is separated satisfactorily, the influence of natural Raman light may need to be considered.

One cycle of the rectangular wave pulse and the gate pulse of the timing circuit of the present invention is the same cycle based on a common clock, assuming that a plurality of excitation wavelength bands are sequentially used by switching, and refers to the period from the turn-on start time of a rectangular wave pulse corresponding to each excitation wavelength band to the next turn-on start time of the rectangular wave pulse corresponding to the excitation wavelength band. Similarly, for each corresponding gate pulse, the cycle refers to the period from the gate start time to the next gate start time of the gate pulse corresponding to the excitation wavelength band.

The excitation wavelength band of the present invention refers to a wavelength range or wavelength band actually used for electron excitation of a measurement target substance within the range of the emission spectrum of a continuous light source.

The turn-on state of the rectangular wave pulse of the present invention refers to a state in which a digital value corresponding to the turn-on state of a continuous light source in the corresponding excitation wavelength band is held, and is usually in the logic 1 state. However, the turn-on state may be in the logic 0 state, and in this case, the turn-off state is the logic 1 state. The turn-on state start time of the rectangular wave pulse is equal to the turn-on start time of the continuous light source, and the turn-on state end time of the rectangular wave pulse is equal to the turn-on end time of the continuous light source.

The gate state of the gate pulse of the present invention refers to a state in which a digital value corresponding to a state in which a gate is applied for counting the number of photons in the corresponding excitation wavelength band in the gate counter circuit, and is usually set to the logic 1 state. The gate state start time of the gate pulse is equal to the gate start time, and the gate state end time of the gate pulse is equal to the gate end time.

The physical parameter of the present invention refers to a specific physical parameter of the sample used for calculating the concentration of the measurement target substance by the concentration calculator. The physical parameter includes physical parameters (for example, pressure, temperature, humidity, or the concentration of a specific component other than the measurement target substance if it is a gas sample) other than the excitation light intensity used for calculating the background contribution term, and varies depending on the detailed calculation formula used. The physical parameter values used may be those measured by the fluorescence measuring device itself of the present invention, those obtained by incorporating data acquired by another device, or those estimated by another method.

The concentration coefficient of the present invention refers to a fluorescence photon count value per concentration obtained in the concentration calibration, that is, the fluorescence intensity measured by the photon measuring method. In the concentration calibration, several or more standard samples with different concentrations including concentration zero that does not contain the measurement target substance are measured, the fluorescence photon count values are plotted on the graph with respect to prepared concentrations, and the slope obtained by linear approximation is the fluorescence photon count value per concentration, that is, the concentration coefficient. In the linear approximation, the measured value of concentration zero is fixed at a point, that is, the measured values are approximated as a straight line passing through the point.

The reference background photon count value of the present invention refers to a fluorescence photon count value in the case of concentration zero that does not contain the measurement target substance in the concentration calibration. This is the intercept of the linear approximation linear approximation of the concentration calibration, but the intercept value is fixed to a measured value rather than giving a degree of freedom.

The reference physical parameter value of the present invention refers to the value of the physical parameter measured during the concentration calibration, measured by another device or the like, or estimated by an appropriate means.

The reference excitation light intensity value of the present invention refers to the value of the excitation light intensity measured by the excitation light intensity detection unit during the concentration calibration.

The excitation light intensity correction coefficient of the present invention refers to the ratio of the current excitation light intensity measurement value measured by the excitation light intensity detection unit to the reference excitation light intensity value. That is, the excitation light intensity correction coefficient represents the relative intensity of the excitation light.

The background photon count conversion value of the present invention is a convenient definition and is assumed to be a linear combination of a constant term that does not depend on the excitation light intensity correction coefficient and a proportional term that is proportional to the excitation light intensity correction coefficient. The background photon count conversion value is an estimated value of the current background photon calculated using the reference background photon count value and the related reference physical parameter value, the current physical parameter value, and the excitation light intensity correction coefficient, measured with a zero-concentration sample that does not contain the measurement target substance during the concentration calibration. The background photons themselves are not counted directly at the current time, so it is called a conversion value.

The fluorescence photon count value of the present invention is a convenient definition, and is a value obtained by subtracting the background photon count conversion value within a predetermined period at the current time from the photon count value within the predetermined period at the current time obtained by the gate counter circuit and refers to a count value corresponding to the contribution of fluorescence only excluding the influence of the background.

The excitation light intensity corrected fluorescence photon count value of the present invention is a convenient definition and refers to a value obtained by dividing the fluorescence photon count value by the excitation light intensity correction coefficient.

The non-quenching excitation light intensity corrected fluorescence photon count value of the present invention is a convenient definition and refers to the excitation light intensity corrected fluorescence photon count value in the quenching substance concentration zero (that is, without quenching) obtained by extrapolating with the relational expression of Stern-Volmer when the fluorescence intensity is reduced due to the presence of the quenching substance.

Hereinafter, embodiments of the present invention will be described with reference to the drawings. As shown in FIG. 1, a fluorescence measuring device 1 of the present invention includes a continuous light source 2, an excitation light irradiation unit 3, an excitation light intensity detection unit 4, a fluorescence detection unit 5, a rectangular wave modulation circuit 6, a timing circuit 7, a gate counter circuit 8, a physical parameter information acquisition unit 9, and a concentration calculator 10. With this configuration, a photon measuring method is appropriately applied to perform digital signal processing with less jitter, and the contribution of background light is calculated and subtracted by an appropriate calculation formula to achieve highly sensitive and accurate quantification of the measurement target substance.

The continuous light source 2 is a continuous light source having a wavelength capable of electronically exciting a measurement target substance. Examples thereof include a deep ultraviolet LED, an ultraviolet LED, a visible LED, a near infrared LED, an ultraviolet semiconductor laser, a visible semiconductor laser, and a near infrared semiconductor laser, depending on the excitation wavelength of the measurement target substance. These lasers have a turn-on rising time and a turn-on falling time of about 50 ns or less, and can be practically modulated. Stability is not specified in particular because there is often no unified regulation in the specifications, but general LEDs and semiconductor lasers can control oscillation by voltage for the former and current for the latter and have sufficient stability of light emission intensity unlike xenon arc lamps and deuterium lamps based on the discharge phenomenon. Further, the monochromaticity, that is, the spectral line width of oscillation varies depending on the measurement target substance, but it does not necessarily have to be narrow. As the semiconductor laser, not only a distributed feedback-type semiconductor laser having a narrow spectral line width and a single oscillation wavelength but also a Fabry-Perot-type semiconductor laser having an oscillation line having a plurality of wavelengths in a relatively narrow band can be used. Rather, regarding the stability of the oscillation wavelength, the distributed feedback-type semiconductor laser with a narrow spectral line width and a single oscillation wavelength requires more precise temperature control of the light source element. In the case of LEDs as well, the temperature of the element affects the emission intensity and its stability. Therefore, as in the case of applying a semiconductor laser, when a heat dissipation fin block is arranged in contact with the element, and a Peltier element is further arranged, it is possible to control the temperature with a precision within at least 0.1° C. Further, a bandpass filter that cuts out a specific wavelength band of the emission spectrum and a lens optical system for efficiently utilizing the luminous flux and condensing it in a specific observation region of the excitation light irradiation unit 3 are optimized according to the radiation characteristics of the continuous light source 2. The continuous light source 2 is actually subjected to rectangular wave modulation to generate excitation light of a rectangular wave pulse, and the details of the rectangular wave modulation will be described in the rectangular wave modulation circuit 6.

When the continuous light source 2 does not require an oscillation spectral line width as narrow as that of a semiconductor laser for excitation of a measurement target substance, an LED having better intensity stability than a semiconductor laser is preferable. In high-precision digital signal processing, there is a problem of microscopic wavelength stability rather than laser coherence, and LEDs with a relatively wide wavelength band are advantageous in terms of stability of excitation light intensity.

The excitation light irradiation unit 3 continuously or intermittently introduces a sample whose medium is a gas or a liquid, and irradiates the excitation light from the continuous light source 2. The measurement target substance molecule in the sample that has absorbed the excitation light condensed to a sample passage point of the excitation light irradiation unit 3 through a window plate or an incident window made of synthetic quartz or another window made of a material that transmits incident light is excited from the ground state to the electronically excited state. A certain percentage of the measurement target substance molecules in the electronically excited state emit fluorescence in a specific wavelength region when returning to the ground state. For the introduction of the excitation light into the excitation light irradiation unit 3, an optical fiber inserted through a flange that maintains an airtight state without passing through the window plate can be used. Further, in order to increase the fluorescence collection efficiency, the wall surface facing the fluorescence detection unit 5 across the incident optical axis of the excitation light is made of an aluminum alloy subjected to electrolytic polishing or combined polishing of electrolytic polishing and mechanical polishing. In this way, the fluorescence emitted in the direction behind the incident optical axis can be reflected and guided to the fluorescence detection unit 5. In the case of a sample whose the medium is a gas, the pressure of the excitation light irradiation unit 3 is conventionally set to an optimum pressure within the range of 0.15 kPa or more and 13 kPa or less, depending on the measurement target substance, and the pressure can be controlled. The optimum pressure is determined by the advantages and disadvantages of the increase in the number of excited molecules due to the number of molecules and the fluorescence quenching effect of the medium molecules. In the inside of the excitation light irradiation unit 3, in order to prevent the scattered light due to the refraction and reflection of the excitation light from directly reaching the fluorescence detection unit 5, a skimmer or orifice with a stepwise reduced aperture can be placed along the optical path of the excitation light so that the peripheral portion of the luminous flux of the excitation light is removed, and the light is condensed in the observation region. In order to prevent adsorption of the measurement target substance, the inner wall of the excitation light irradiation unit 3 is made of an appropriate inert substance, or is subjected to inert coating or surface treatment. Further, the inner wall may be subjected to coating or surface treatment so that scattering of the excitation light on the wall surface is suppressed. Since it is difficult to obtain a treatment that achieves both an adsorption prevention effect and a scattering suppression effect, instead of covering the entire wall surfaces with the same substance, coating, or surface treatment, the substrate, coating, and the surface treatment are used appropriately depending on which one of the effects is to be emphasized. Examples of the inert material or the material subjected to the inert surface treatment include, but not limited to, fluororesins such as polytetrafluoroethylene, polyether ether ketone resins, and stainless steel polished by a combination of electrolytic polishing and mechanical polishing, electropolished stainless steel coated with a fluororesin such as polytetrafluoroethylene, and electropolished stainless steel obtained by chemically depositing hydrided amorphous silicon and further inactivating to bond an alkyl group. Since these surface treatments involve surface smoothing, the excitation light may be easily scattered. A typical example of the surface treatment having a high excitation light scattering suppression effect is a black-painted alumite treatment applied on top of a satin finish of an aluminum alloy. In particular, when the measurement target substance is a substance that is easily adsorbed, the temperature of the housing of the excitation light irradiation unit 3 can be controlled to 105° C. or higher to minimize the influence of adsorption.

The excitation light intensity detection unit 4 measures at least one of the amount of scattered light of the excitation light due to reflection or refraction and the amount of a part of the transmitted light of the excitation light irradiation unit 3 in an internal light path of the excitation light irradiation unit 3 or an external light path from the continuous light source 2 to the excitation light irradiation unit 3. In the case of scattered light of excitation light and in the case of measurement of transmitted light, the amount of a part of light is measured. This is because it is not necessary to measure the amount of entire light if it is confirmed in advance that there is a perfect proportional relationship with the intensity of the original excitation light. The light amount detector used in the excitation light intensity detection unit 4 is not particularly limited, but generally, a silicon photodiode having excellent linearity is used. Since a photocurrent is generated in proportion to the amount of light incident on the detector, this is converted from current to voltage and incorporated into an A/D conversion circuit and converted into a digital signal, and the average for a predetermined period is taken as the excitation light intensity measurement value. In this way, it is possible to monitor fluctuations in the original excitation light in a short time and changes in intensity over a long period of time. In the A/D conversion circuit of the excitation light intensity detection unit 4, when the physical parameters used for calculating the background count conversion value, typically the pressure and temperature of the sample in the excitation light irradiation unit 3, are measured inside the fluorescence measuring device 1, the measurement values thereof are also input and converted into digital values. The A/D conversion circuit can be realized as an independent dedicated substrate, an A/D conversion board, and an A/D conversion card, and a circuit may be mounted as a functional block on the FPGA board.

The fluorescence detection unit 5 detects the fluorescence emitted from the electronically excited state of the molecule of the measurement target substance in the internal space of the excitation light irradiation unit 3 according to a photon counting system. Examples of a detector that realizes the photon counting system include, but not limited to, a combination of a current output-type photomultiplier tube and an amplifier/discriminator, a module in which a photomultiplier tube called a photomultiplier head, a photon counting circuit, and a high-voltage power supply are integrated, and a solid-state element in which a plurality of Geiger mode APDs (avalanche photodiodes) called MPPCs (multipixel photon counters) are arranged on a plane. In the fluorescence detection unit 5, fluorescence is passed through the window plate of the excitation light irradiation unit 3 or the window of the excitation light irradiation unit 3, and a condenser lens group, an aperture or an optical guide, an optical element for selecting the fluorescence wavelength region to be detected for distinguishing from the excitation light wavelength, and the like are arranged in front of the detector by appropriately combining the numbers and order according to the measurement target substance, the excitation wavelength band, and the fluorescence wavelength region to be detected. Examples of the optical element for selecting the fluorescence wavelength region to be detected include, but not limited to, a long-pass filter, a bandpass filter, a spectroscope, an acoustic optical tunable filter, and a combination thereof.

The rectangular wave modulation circuit 6 supplies a DC voltage or a DC current corresponding to a high state in which turn-on is maintained and a low state corresponding to turn-off to the continuous light source 2 in rectangular waves based on the pulse train of the rectangular wave pulse generated by repeating the logic 0 state and the logic 1 state generated by the timing circuit 7. A combination in which a low state corresponds to the logic 0 state and a high state corresponds to the logic 1 state, and a combination in which a low state corresponds to the logic 1 state and a high state corresponds to the opposite logic 1 state are also possible. In the high state, a voltage or a current is set such that the continuous light source 2 is stably turned on, a sufficient excitation light intensity is obtained, the lifetime of the continuous light source 2 is not remarkably shortened, or an adverse effect occurs due to heat generation. On the other hand, in the low state, in the case of an LED, the voltage may be completely reduced to 0V. However, in the case of a semiconductor laser, in order to alleviate the problem of rise time and the problem of frequency change due to thermal distortion of an element called a chirp, it is common to set a low current other than 0 mA that is slightly below the oscillation threshold. Rectangular wave modulation is performed with a DC voltage in the case of an LED and a DC current in the case of a semiconductor laser or the like.

The timing circuit 7 generates a rectangular wave pulse supplied to the rectangular wave modulation circuit 6, which is a repetition of the logic 0 state and the logic 1 state, and also generates a gate pulse for signal processing by the same clock. The influence of commercial power supply noise can be eliminated by setting the clock frequency to, for example, a frequency that is not a multiplication of the commercial power supply frequency obtained by dividing the internal clock of the FPGA board. Most FPGAs are equipped with a dedicated clock distribution delay reduction circuit called a phase-locked loop (PLL) or delay-locked loop (DLL). Since the PLL and DLL also have a frequency synthesis function as standard, and odd division can be easily performed, it is possible to set a frequency that is not a multiplication of the commercial power frequency. The clock frequency can be set so that a count value of photons derived only from the fluorescence excluding the background light between the gates of one cycle in the gate counter circuit 8 set by the gate pulse is set in the range of 0.0005 to 200/gate, and the measurement load cycle can be set to be as large as possible. When a plurality of excitation wavelength bands are sequentially used by switching in time by a single or a plurality of continuous light sources 2 and typically the same number of measurement target substances as the number of excitation wavelength bands are measured, the frequency of the clock can be set so that the count value of photons derived only from the fluorescence excluding the background light between the gates of one cycle corresponding to each excitation wavelength band in the gate counter circuit 8 set by each gate pulse corresponding to each excitation wavelength band is in the range of 0.0005 to 200/gate, and the measurement load cycle can be set to be as large as possible.

The rectangular wave pulse in the timing circuit 7 can be set so that the turn-on state start time of the rectangular wave pulse is later than or equal to the later time of the gate state end time of the gate pulse of the previous cycle and the time obtained by adding the fluorescence lifetime of the measurement target substance to the turn-on state end time of the previous rectangular wave pulse and that the turn-on state time width is sufficient for obtaining the molecules in the electronically excited state of the measurement target substance sufficient for detecting the fluorescence within the range of 0.0005 to 200/gate related to the count value of photons derived only from the fluorescence between the gates in the gate counter circuit 8. When a plurality of excitation wavelength bands are sequentially used by switching in time by a single or a plurality of continuous light sources 2 and typically the same number of measurement target substances as the number of excitation wavelength bands are measured, each rectangular wave pulse related to the turn-on of the continuous light source 2 in each excitation wavelength band can be set so that the turn-on state start time of the rectangular wave pulse is later than or equal to the later time of the gate state end time of the gate pulse corresponding to the previous excitation wavelength band and the time obtained by adding the longest fluorescence lifetime of the fluorescence lifetimes of all measurement target substances contributing to the fluorescence in the previous excitation wavelength band to the turn-on state end time of the rectangular wave pulse corresponding to the previous excitation wavelength band and that the turn-on state time width of the rectangular wave pulse is sufficient for obtaining the molecules in the electronically excited state of the measurement target substance sufficient for detecting the fluorescence within the range of 0.0005 to 200/gate related to the count value of photons derived only from the fluorescence between the gates corresponding to the excitation wavelength band in the gate counter circuit 8.

The gate pulse in the timing circuit 7 can be set so that the gate state start time is later than the time when the continuous light source 2 of the excitation wavelength band is turned on and the output is stabilized and the gate state end time is later than or equal to the turn-on state end time of the rectangular wave pulse. When a plurality of excitation wavelength bands are sequentially used by switching in time by a single or a plurality of continuous light sources 2 and typically the same number of measurement target substances as the number of excitation wavelength bands are measured, the gate pulse corresponding to each excitation wavelength band can be set so that the gate state start time is later than the time when the continuous light source 2 in the excitation wavelength band is turned on and the output is stabilized and the gate state end time is later than or equal to the turn-on state end time of the rectangular wave pulse.

The gate counter circuit 8 integrates and counts the photon count in a predetermined period by inputting the gate pulse generated by the timing circuit 7, applying a gate thereto, and counting the number of occurrence times of the pulse signal from the fluorescence detection unit 5 corresponding to one photon of fluorescence in a time region in which fluorescence is the main component.

The timing circuit 7 and the gate counter circuit 8 can be configured by an FPGA board on which an FPGA is mounted, and a commercially available FPGA board may be further equipped with an SSD (semiconductor drive) as a memory constituting the concentration calculator 10 described below and a microcomputer. Further, an A/D conversion circuit may be mounted as a functional block to constitute the A/D conversion circuit of the excitation light intensity detection unit 4. The FPGA is also called a field programmable gate array, and refers to an integrated circuit or an integrated circuit chip that can be freely programmed by a user by changing the connection configuration of a logic circuit. Conventionally, in order to perform fluorescence measurement by a highly sensitive photon counting system, it is common to use a boxcar integrator using an independent pulse generator or a delayed pulse generator or use a timer/counter board and the like that also serves as the timing circuit 7 and the gate counter circuit 8 as a function equivalent to the timing circuit 7. However, for driving these elements, a microcomputer and software for each application are required, the hardware is redundant and is not suitable for downsizing the device, and the hardware components have to be wired. In addition, since the hardware is dispersed, jitter due to load cycle distortion has been a problem, but jitter can be easily controlled by using an integrated FPGA board that is driven by the hardware language and has excellent parallel processing. Semiconductor integrated circuits that compete with FPGAs for configuring the timing circuit 7 and the gate counter circuit 8 include large-scale integrated circuits (ASSPs) for specific applications and large-scale customized large-scale integrated circuits (ASICs). However, there is no general-purpose product for fluorescence measurement, and it costs a huge amount of money to develop such products.

The physical parameter information acquisition unit 9 acquires a specific physical parameter value of the sample at the current time required in the calculation of the concentration of the measurement target substance. The specific physical parameter includes physical parameters (for example, pressure, temperature, humidity, or the concentration of a specific component other than the measurement target substance if it is a gas sample) other than the excitation light intensity used for calculating the background contribution term, and varies depending on the detailed calculation formula used. The physical parameter values used may be those measured by the fluorescence measuring device 1 itself of the present invention, those obtained by incorporating data acquired by another device, or those estimated by another method. Therefore, the aspect of the physical parameter information acquisition unit 9 differs depending on the acquisition method.

As shown in steps S01 to S08 of FIG. 2, the concentration calculator 10 performs concentration calibration in advance, obtains the concentration coefficient of the measurement target substance expressed as the fluorescence photon count value per concentration, and at the same time, stores in a memory, the reference background photon count value measured with the sample not containing the target substance during the concentration calibration, the related reference physical parameter value, and the reference excitation light intensity value obtained by the excitation light intensity detection unit 4 during the concentration calibration. It is assumed that the concentration calibration using a standard gas here is performed once a year or once every six months during maintenance and inspection. In the current measurement, the background photon count conversion value within the predetermined period at the current time is subtracted from the photon count value within the predetermined period at the current time obtained by the gate counter circuit 8, and the obtained fluorescence photon count value which is the contribution of only fluorescence is divided by an excitation light intensity correction coefficient expressed as the ratio between the current excitation light intensity measurement value obtained by the excitation light intensity detection unit 4 and the stored reference excitation light intensity value to obtain the excitation light intensity corrected fluorescence photon count value. The concentration of the measurement target substance is digitally calculated by dividing the obtained excitation light intensity corrected fluorescence photon count value by the concentration coefficient of the stored measurement target substance. That is, the calculation formula of the concentration C of the measurement target substance is expressed by the following equation (1) when Ip is the current photon count value within the predetermined period obtained by the gate counter circuit 8, B is the current background photon count conversion value within the predetermined period, I is the current excitation light intensity, I0 is the reference excitation light intensity value during concentration calibration, fe is the excitation light intensity correction coefficient, If is the fluorescence photon count value, Ifd is the excitation light intensity corrected fluorescence photon count value, and a is the concentration coefficient during concentration reference calibration. Here, the excitation light intensity correction coefficient fe is defined by Equation (2).

[Math. 1]
$$a \cdot C = I_{fd} \quad (1)$$
$$= \frac{I_f}{f_e}$$
$$= \frac{I_p - B}{f_e}$$
$$f_e = \frac{I}{I_0} \quad (2)$$

Here, the background photon count conversion value used in the calculation of the concentration C of the measurement target substance in the concentration calculator 10 is calculated by the following the procedure 1. That is, the background photon count conversion value is calculated using the reference background photon count value and the related reference physical parameter value measured with a sample that does not contain the measurement target substance during the concentration calibration stored in advance, and the current physical parameter value acquired by the physical parameter information acquisition unit 9, and the excitation light intensity correction coefficient assuming that it is a linear combination of a constant term that does not depend on the excitation light intensity correction coefficient and a proportional term that is proportional to the excitation light intensity correction coefficient. In procedure 1, regardless of what the constant term and the proportional term are caused by, the background photon count value is obtained by actively changing the excitation light intensity of the continuous light source 2 during zero calibration in the concentration calibration in advance, and the constant term and the proportional term are defined from the intercepts and slopes obtained by linear approximation for convenience. As the physical parameter affects the proportional term, if a simple physical parameter such as temperature or pressure is taken, the excitation light intensity is fixed and the value of the physical parameter is changed, so that the calculation formula is approximately obtained as a physical parameter function. In many cases, these physical parameters are controlled or are originally considered to be a system with minute fluctuations, and the effect on the background photon count conversion value when sensitivity analysis is performed can be ignored as compared with the effect due to fluctuations in the excitation light intensity. Thus, the calculation formula is a simple operation. Conventionally, the mainstream method is to ignore the background light or background as being sufficiently suppressed, or to subtract it as an analog measurement value by an analog circuit. However, the definition of the background to be subtracted is unclear, and despite the fact that there are backgrounds with various characteristics, they have been treated collectively as the background. However, for example, when the medium of a sample is air, a substance with a concentration of ppb or lower is measured, and the wavelength region of fluorescence is very close to the wavelength of excitation light, the contribution of Rayleigh scattering due to nitrogen and oxygen is large which cannot be ignored. Since the scattering cross-sectional area of Rayleigh scattering has a unique numerical value depending on the substance and is proportional to the number of molecules, that is, the concentration, it is correlated with the pressure and temperature of the sample gas in the excitation light irradiation unit 3, and is proportional to the excitation light intensity or the excitation light intensity correction coefficient. The component which causes the background includes a component that is proportional to the excitation light intensity and a component that has a fixed value, but these components have to be collectively treated as a fixed value in the analog circuit. In the present invention, digital signal processing is adopted, and the concentration can be measured with high sensitivity and accuracy by calculating the contribution of the current background accurately from the reference background photon count value, the reference physical parameter value, the current physical parameter value such as temperature and pressure, and the excitation light intensity correction coefficient. The calculated value of the contribution of the current background is referred to as the background photon count conversion value for the sake of distinction. The procedure 1 described above is a first detailed the procedure of steps S02 and S03 of FIG. 2, and corresponds to steps S100 to S107 of FIG. 3.

An example of the calculation formula of the current background photon count conversion value B calculated in the above the procedure 1 is shown below. However, the following is an example and is not limited to this. It is assumed that the reference background photon count value B0 is composed of the sum of the constant term b that does not depend on the reference excitation light intensity value and the reference value m0 of the proportional term that is proportional to the excitation light intensity correction coefficient fe as in Equation (3). The values of each term obtained during the concentration calibration are stored. Next, the current background photon count conversion value B is composed of the constant term b of the stored reference background photon count value and the proportional term M proportional to the excitation light intensity correction coefficient fe. The proportional term M is calculated as the product of the reference value m0 of the proportional term, a physical parameter normalization function $Nm(Pj, Pj0)$ using the stored reference physical parameter value $Pj0$ and the current physical parameter value $Pj$, and the excitation light intensity correction coefficient fe. The calculation of the current background photon count conversion value B can be summarized as Equation (4). The physical parameter normalization function $Nm(Pj, Pj0)$ has a different function form depending on what is used as the physical parameter. However, when the temperature and pressure of the excitation light irradiation unit 3 are precisely controlled, and it is considered that the composition other than the measurement target substance in the sample does not change, the physical parameter normalization function Nm can be treated as equal to 1 as in Equation (5). The subscript 0 indicates that it is a reference state, that is, an explanatory variable at the time of density calibration, and is synonymous in the following paragraphs. In addition, the physical parameter normalization function is a convenient concept to express a correction in the form of a correction coefficient because the value of the physical parameter differs from the reference state to the current state, and it is necessary to make a correction when calculating the proportional term. This concept will be treated synonymously in the following paragraphs.

[Math. 2]

$$B_0 = b + m_0 \quad (3)$$

$$B = b + m_0 \cdot Nm(P_j, P_{j0}) \cdot f_e \quad (4)$$

$$Nm(P_j, P_{j0}) = 1 \quad (5)$$

When the FPGA board is used as the memory for storing the density coefficient value, the reference background photon count value, the related reference physical parameter value, and the reference excitation light intensity value in the concentration calculator 10, although a memory block is present in the FPGA chip itself, SSDs are often mounted. When a large-capacity external storage device is required, a hard disk drive (HDD), a USB memory, an SD card, an SSD, and the like are used. However, SSD is generally used because of its high processing speed.

Generally, when the physical parameter value acquired by the physical parameter information acquisition unit 9 fluctuates relatively greatly or fluctuates in the long term, the reference background photon count value B0 used in the calculation in the concentration calculator 10 and the current background photon count conversion value B are preferably calculated by the following the procedure 2. First, it is assumed that the reference background photon count value B0 is composed of the sum of a constant term b that does not depend on the reference excitation light intensity value, a reference excitation light scattering contribution term S0 due to reflection and refraction in the excitation light irradiation unit 3, and a reference Rayleigh scattering contribution term Ri0 due to a component i which is the main component in the sample medium and has a large Rayleigh scattering cross-sectional area and in which the contribution of Rayleigh scattering cannot be ignored, and the values of each term obtained during concentration calibration are stored. Next, it is assumed that the current background photon count conversion value B is composed of the sum of the stored constant term b of the reference background photon count value, a current excitation light scattering contribution term S as the proportional term that is proportional to the excitation light intensity correction coefficient fe, and the current Rayleigh scattering contribution term Ri as the proportional term that is proportional to the excitation light intensity correction coefficient fe. The excitation light scattering contribution term S is calculated using the stored reference excitation light scattering contribution term S0 and reference physical parameter value, and the current physical parameter value, and the excitation light intensity correction coefficient acquired by the physical parameter information acquisition unit 9. The Rayleigh scattering contribution term Ri is calculated using the stored reference Rayleigh scattering contribution term Ri0 and reference physical parameter value, and the current physical parameter value and the current excitation light intensity correction coefficient. It should be noted that Ri corresponds to a component in which the contribution of Rayleigh scattering cannot be ignored due to the large scattering cross-sectional area in the sample and the presence in high concentration, and is an explanatory variable not limited to one, so a subscript is added. In many cases, the component in which the contribution of Rayleigh scattering cannot be ignored is a medium component. For example, when the sample is a gas sample, the component corresponds to air and water vapor since the component ratios of oxygen and nitrogen do not change. By the procedure 2, if the contribution of Rayleigh scattering in the background is clearly separated and treated, the fluorescence measurement method can be applied to the quantification of a substance having a small wavelength difference between the excitation wavelength and the fluorescence wavelength and a substance having a short fluorescence lifetime and having difficulty in separating Rayleigh scattering and fluorescence in time. Moreover, a non-coherent LED or the like can be used as the continuous light source 2, and a measurement target substance typically having a low concentration of ppb or less can be measured with high accuracy. The procedure 2 described above is a second detailed the procedure of steps S02 and S03 of FIG. 2, and corresponds to steps S200 to S210 of FIG. 4.

An example of the calculation formula of the current background photon count conversion value B calculated in the above the procedure 2 is shown below. However, the following is an example and is not limited to this. The reference background photon count value B0 is expressed by Equation (6) as the sum of the constant term b that does not depend on the reference excitation light intensity value, the reference excitation light scattering contribution term S0 due to reflection and refraction in the excitation light irradiation unit 3, and the reference Rayleigh scattering contribution term Ri0 due to the main component i of the sample medium, and each term is stored. The excitation light scattering contribution term S is calculated by correcting the stored reference excitation light scattering contribution term S0 by the physical parameter normalization function NS(Pj, Pj0) using the stored reference physical parameter value Pj0 and the current physical parameter value Pj and further multiplying the corrected term by the excitation light intensity correction coefficient fe expressed as a ratio between the excitation light intensity measurement value I and the reference excitation light intensity value I0. The Rayleigh scattering contribution term Ri is calculated by correcting the stored reference Rayleigh scattering contribution term Ri0 by the physical parameter normalization function NRi (Pj, Pj0) using the stored reference physical parameter value Pj0 and the current physical parameter value Pj and further multiplying the corrected term by the excitation light intensity correction coefficient fe. The calculated terms are put together to obtain the background photon count conversion value B by Equation (7). Here, the function form of the physical parameter normalization function differs depending on what is used as the physical parameter. The constant term b is, for example, the dark count of the photon counting head, the leakage of indoor light that rarely changes, the scattered light of the excitation light due to reflection and refraction outside the excitation light irradiation unit 3, or the leakage of light emitted from a component outside the excitation light irradiation unit 3 in the device. These light components other than the dark count can be reduced to almost zero by appropriately taking measures against shading on the excitation light irradiation unit 3. The dark count can be reduced by cooling, but when cooling is performed by a Peltier element, for example, it can be regarded as a constant because the temperature is precisely controlled. The excitation light scattering contribution term S is a term representing the contribution of the scattered light of the excitation light due to the reflection and refraction inside the excitation light irradiation unit 3. When the optical system is arranged appropriately so that light incident from the continuous light source 2 to the excitation light irradiation unit 3 is introduced, the excitation light scattering contribution term S is proportional to the excitation light intensity or the excitation light intensity correction coefficient fe and is rarely affected by other physical parameters. Thus, the physical parameter normalization function NS(Pj, Pj0) can be treated as equal to 1 as in Equation (8). The Rayleigh scattering contribution term Ri is a term representing the contribution of Rayleigh scattering by the component contributing to Rayleigh scattering in the sample, and is proportional to the concentration or molar fraction mni of the component contributing to Rayleigh scattering and the excitation light intensity correction coefficient fe. Thus, it is necessary to calculate the Rayleigh scattering contribution term Ri for each component i that contributes to Rayleigh scattering. For example, if the sample is an air sample of which the main component composition rarely changes, the humidity is low, and the contribution of Rayleigh scattering due to water vapor can be ignored, it is considered that one component (i=1) of air only contributes to Rayleigh scattering, and there are two physical parameters (j=2) including the pressure Pe and the temperature Te in the excitation light irradiation unit 3. Since Rayleigh scattering is proportional to the number of molecules, the physical parameter normalization function NRi(Pj, Pj0) is only NR1(Pj, Pj0) and is expressed by Equation (9).

[Math. 3]

$$B_0 = b + S_0 + \sum R_{i0} \quad (6)$$

$$B = b + S_0 \cdot NS(P_j, P_{j0}) \cdot f_e + \sum [R_{i0} \cdot NR_i(P_j, P_{j0}) \cdot f_e] \quad (7)$$

$$NS(P_j, P_{j0}) = 1 \quad (8)$$

$$NR_1(P_j, P_{j0}) = \frac{P_e \cdot T_{e0}}{P_{e0} \cdot T_e} \quad (9)$$

Further, for example, when the sample is a liquid sample of which the main component composition rarely changes and is a single solvent such as acetonitrile, the main component is considered to be acetonitrile only (i=1), and Rayleigh scattering is proportional to the number of molecules, that is, the density. Therefore, the temperature is measured and the density is obtained by a density estimation formula, and the related physical parameter is only the temperature Te (j=1) in the excitation light irradiation unit 3. The physical parameter normalization function NRi(Pj, Pj0) is only NR1(Pj, Pj0), and most simply, the coefficient of thermal expansion b of an organic compound is treated as constant regardless of the temperature, and is expressed by Equation (10). The above is an example of the physical parameter to be used and the function form of the physical parameter normalization function, and is not limited to this.

[Math. 4]

$$NR_1(P_j, P_{j0}) = \frac{1 + b \cdot T_{e0}}{1 + b \cdot T_e} \quad (10)$$

When a high-concentration Raman active substance coexists in the sample and the contribution of natural Raman scattering cannot be ignored, the reference background photon count value and the current background photon count conversion value used in the calculation in the concentration calculator 10 are preferably calculated by the following the procedure 3. That is, it is assumed that the reference background photon count value B0 is composed of the sum of the terms obtained by adding a reference natural Raman scattering contribution term RMk0 by the component k having Raman activity in the sample to the terms shown in the procedure 2, and the values of each term obtained during concentration calibration are stored. Next, it is assumed that the current background photon count conversion value B is composed of the sum of the proportional terms shown in the procedure 1 and the current natural Raman scattering contribution term RMk. The natural Raman scattering contribution term RMk is calculated using the stored reference natural Raman scattering contribution term RMk0, the stored reference physical parameter value Pj0, the current physical parameter value Pj, and the excitation light intensity correction coefficient fe. It should be noted that k corresponds to a component in which the contribution of natural Raman scattering cannot be ignored due to the Raman activity in the sample and the presence in a high concentration, and is not limited to one, so the subscript is used. According to the procedure 3, when the sample is mainly a liquid sample, and particularly a substance (typically, water) having a large Raman scattering cross-sectional area due to the fact that the solvent is a highly symmetric molecule and has hydrogen bonding properties, the Rayleigh scattering can be eliminated by a bandpass filter, a long-pass filter, or a spectroscope. However, the fluorescence measurement method can be applied to cases where natural Raman scattering of the solvent causes interference because it is an ultra-trace analysis. The procedure 3 described above is a third detailed the procedure of steps S02 and S03 of FIG. 2, and corresponds to steps S300 to S312 of FIG. 5.

An example of the calculation formula of the background photon count conversion value B at the current time calculated in the above the procedure 3 is shown below. However, the following is an example and is not limited to this. The reference background photon count value B0 is expressed by Equation (11) in which the reference natural Raman scattering contribution term RMk0 is added to the right side of the equation (6) in the procedure 2, and each term is stored. The natural Raman scattering contribution term RMk is calculated by correcting the stored reference natural Raman scattering contribution term RMk0 by the physical parameter normalization function NRMk(Pj, Pj0) using the stored reference physical parameter value Pj0 and the current physical parameter value Pj and further multiplying the corrected terminal by the excitation light intensity correction coefficient fe. The calculated natural Raman scattering contribution term RMk is added to the right side of Equation (7) of the procedure 2, and the terms are put together to obtain the background photon count conversion value B by Equation (12). For example, when there is one substance (k=1) having Raman activity, the related physical parameter is j=1, and Pj is only the concentration Cr of the substance having Raman activity. The physical parameter normalization function NRMk(Pj, Pj0) is only NRM1(Pj, Pj0) and is expressed by Equation (13).

[Math. 5]

$$B_0 = b + S_0 + \sum R_{i0} + \sum RM_{k0} + AF_0 \quad (11)$$

$$B = b + S_0 \cdot NS(P_j, P_{j0}) \cdot f_e + \sum \{R_{i0} \cdot NR_i(P_j, P_{j0}) \cdot f_e\} + \sum \{RM_{k0} \cdot NRM_k(P_j, P_{j0}) \cdot f_e\} \quad (12)$$

$$NRM_k(P_j, P_{j0}) = \frac{C_r}{C_{r0}} \quad (13)$$

In a case where the sample is a liquid medium, the measurement target substance is fluorescently labeled, and the fluorescence of the fluorescently labeled product is measured, if the contribution of autofluorescence by the measurement target substance or a substance containing the measurement target substance in the sample cannot be ignored, the reference background photon count value and the current background photon count conversion value used in the calculation in the concentration calculator 10 are preferably calculated by the following the procedure 4. That is, it is assumed that a reference background count value B0 is composed of the sum of the terms obtained by adding a reference autofluorescence contribution term AF0 by the sample to the terms shown in the procedures 2 and 3 and the values of each term obtained during the concentration calibration are stored. It is assumed that the current background photon count conversion value B is composed of the sum obtained by adding a current autofluorescence contribution term AF to the proportional terms shown in the procedures 2 and 3. An autofluorescence contribution term AF is calculated using the stored reference autofluorescence contribution term AF0, the stored reference physical parameter value Pj0, the current physical parameter value Pj, and the current excitation light intensity correction coefficient fe. According to the procedure 4, in a case where a specific protein such as serum albumin is analyzed using a fluorescent probe such as 1-anilinonaphthalene-8-sulphonic acid as a solution sample derived from a living body, in a case of using a flow cytometry for performing fluorescent labeling in general, and in a case of using a flow injection analysis method using a fluorescent probe, for example, analyzing selenium by adding 2,3-diaminonaphthalene, it is possible to perform high-sensitivity measurement by separate the influence of autofluorescence caused by biological pigments such as contaminants, amino acid residues, or chlorophyll, or substances or objects such as cells and bacteria. The procedure 4 described above is a fourth detailed the procedure of steps S02 and S03 of FIG. 2, and corresponds to steps S400 to S413 of FIG. 6.

An example of the calculation formula of the current background photon count conversion value B calculated in the procedure 4 is shown below. However, the following is an example and is not limited to this. The reference background photon count value B0 is expressed by Equation (14) in which the reference autofluorescence contribution term AF0 is added to the right side of the equation (11) in the procedure 3, and each term is stored. The autofluorescence contribution term AF is calculated by correcting the stored reference autofluorescence contribution term AF0 by the physical parameter normalization function NAF(Pj, Pj0) using the stored reference physical parameter value Pj0 and the current physical parameter value Pj and further multiplying the corrected term by the excitation light intensity correction coefficient fe. The calculated autofluorescence contribution term AF is added to the right side of Equation (12) of the procedure 3 and the terms are put together to obtain the background photon count conversion value B by Equation (15).

[Math. 6]

$$B_0 = b + S_0 + \Sigma R_{j0} + \Sigma RM_{k0} + AF_0 \quad (14)$$

$$b = B + S_0 \cdot NS(P_j, P_{j0}) \cdot f_e + \Sigma (R_{k0} \cdot NR_i(P_j, P_{j0}) \cdot f_e) + \Sigma (RM_{k0} \cdot NRM_k(P_j, P_{j0}) \cdot f_e) + AF_0 \cdot NAF(P_j, P_{j0}) \cdot f_e \quad (15)$$

If a quenching substance that quenches the fluorescence of the measurement target substance is present in the sample and the quenching effect cannot be ignored, it is necessary to correct the effect of quenching. In this case, the concentration calculator 10 preferably calculates the concentration by substituting the excitation light intensity corrected fluorescence photon count value Ifd with a non-quenching excitation light intensity corrected fluorescence photon count value Ifd0 obtained by the Stem-Volmer relational expression between a non-quenching excitation light intensity corrected fluorescence photon count value Ifd0 in the absence of a quenching substance X, the concentration [X]

of the quenching substance, and a Stern-Volmer constant Ksv which is the product between a quenching rate constant and a fluorescence lifetime in the absence of the quenching substance, as shown in steps S500 to S505 of FIG. 7. As a result, even when the influence of the quenching substance such as water vapor or nitrogen in the gas sample, for example, is large, the concentration of the measurement target substance can be accurately obtained from the actual fluorescence measurement result. The Stern-Volmer relational expression is expressed as Equation (16), for example. The Stern-Volmer constant Ksv is obtained by preparing several standard samples in which a measurement target substance having a constant concentration is contained in advance and the concentration [X] of the quenching substance is changed, obtaining the corresponding excitation light intensity corrected fluorescence photon count value Ifd, plotting the reciprocal number of the excitation light intensity corrected fluorescence photon count value Ifd and the quenching substance concentration, and calculating the slope by the least-square method according to linear approximation. According to the procedure using the Stem-Volmer relational expression, in the case of a measurement target substance that has a long fluorescence lifetime and is easily affected by a quenching substance such as water vapor, for example, when it is desired to measure the nitrogen dioxide concentration of a moist air sample by fluorescence measurement in the visible region, if the water vapor concentration is separately measured at the same time, accurate measurement can be performed regardless of the fluctuation of the water vapor concentration.

[Math. 7]

$$\frac{I_{fd0}}{I_{fd}} = 1 + K_{sv} \cdot [X] \quad (16)$$

When there are a plurality of measurement target substances and fluorescence at the same number of excitation wavelengths or fluorescence wavelengths is measured to obtain the concentration Cm of the measurement target substance, the concentration calculator of the concentration calculator 10 preferably determines the concentration of the plurality of measurement target substances by solving a simultaneous equation assuming that a plurality of excitation light intensity corrected fluorescence photon count values Ifdn or a plurality of non-quenching excitation light intensity corrected fluorescence photon count values Ifd0n is a linear combination of the concentration Cm of the same number of measurement target substances and the same number of concentration coefficients amn. Here, m corresponds to a plurality of measurement target substances, and n is a subscript corresponding to the same number of excitation light intensity corrected fluorescence photon count values Ifdn or the same number of non-quenching excitation light intensity corrected fluorescence photon count values Ifd0n. For example, even if there is one measurement target substance of interest, if there is one interfering substance and fluorescence is measured at two different excitation wavelengths or fluorescence wavelengths, the interfering substance is treated as another measurement target substance, that is, it is treated that there are two measurement target substances. As a result, even when an interfering substance is present, the concentration of the measurement target substance can be accurately determined by fluorescence measurement. As a result, it becomes possible to use a non-coherent continuous light source 2 that oscillates in a relatively wide band like an LED, so that the applicable range of fluorescence measurement is expanded. The simultaneous equations in the presence of two measurement target substances are expressed by Equation (17), for example.

[Math. 8]

$$a_{11} \cdot C_1 + a_{21} \cdot C_2 = I_{fd1}$$

$$a_{12} \cdot C_1 + a_{22} \cdot C_2 = I_{fd2} \quad (17)$$

EXAMPLE

Hereinafter, the present invention will be described in more detail with reference to Examples, but the present invention is not limited to these Examples at all.

Example 1

As an example embodying the embodiment of the present invention shown in FIG. 1, a monitor that measures the soundness of the intestinal flora, that is, the phenol concentration in exhaled breath, which is an index of the presence of some intestinal bacteria, which are so-called bad bacteria will be described. Bad bacteria specifically possess an enzyme, tyrosine phenol lyase, or the like that produces phenol from the aromatic amino acid tyrosine to produce phenol, and the phenol produced in the intestine is rapidly absorbed and transferred to the blood. Thus, the bad bacteria exist as a gaseous state in the exhaled breath via the alveolar. Since the phenol concentration in the exhaled breath reflects the blood concentration, the state of the intestinal flora can be known by measuring the concentration in the exhaled breath. There are some bad bacteria that produce p-cresol and some that produce both, but those that produce phenol are predominant. If you have not eaten food such as coffee, wine, and grapes within 8 hours and have not been administered any drug, the substance that exists in the exhaled breath and absorbs light with a wavelength around 265 nm and emits fluorescence can be considered to be composed of a large amount of phenol and a small amount of p-cresol. Since phenol has a small difference called Stokes shift between the maximum excitation wavelength and the maximum fluorescence wavelength and the full width at half maximum of the excitation wavelength is as wide as 10 nm when a spectroscope is not used, it is difficult to eliminate the influence of Rayleigh scattered light due to scattered light caused by reflection or the like of the excitation light on the wall surface or the like depending on the detection wavelength, and carbon dioxide, oxygen, nitrogen and water vapor in the exhaled breath. Further, the fluorescence lifetime at the excitation wavelength of 265 nm is about 2 ns, and if the fluorescence is detected with a delay time after the influence of the scattered light of the excitation light is reduced by turning off the excitation light with respect to these scattered light components which can be regarded as almost at the same time as the irradiation of the excitation light, the load cycle of measurement becomes extremely low. The influence of scattered light of the excitation light, which is also called stray light, on the wall surface of the fluorescent cell near the excitation light irradiation unit 3 can be reduced by devising the structure of the fluorescent cell or the like. However, Rayleigh scattering of excitation light by a substance that is present in a relatively large amount and has a large scattering cross-sectional area, other than the measurement target substance in the fluorescent cell inevitably occurs. It is difficult to separate Rayleigh scattering and fluorescence by the detection wavelength, which is particularly a problem when measuring weak fluorescence.

Therefore, in the phenol monitor that matches the fluorescence characteristics of phenol, the continuous light source 2 is a deep ultraviolet LED with a center wavelength of 265 nm and an optical output of 45 mW, the wavelength band is narrowed by a bandpass filter, and the rectangular wave modulation circuit 6 generates a rectangular wave of 17 kHz which is repeatedly turned on for 90% of one cycle (that is, for 52.9 µs) and turned off for the remaining 10% (that is, 5.9 µs), which is used as the excitation light. In this example, the excitation light irradiation unit 3 is a fluorescent cell through which the exhaled gas is circulated, and in order to prevent the scattered light due to the refraction and reflection of the excitation light from directly reaching the fluorescence detection unit 5, a skimmer with a stepwise reduced aperture is placed along the optical path of the excitation light so that the peripheral portion of the luminous flux of the excitation light is removed, and the light is condensed in the observation region. In order to prevent adsorption of the measurement target substance, the inner wall of the excitation light irradiation unit 3 is made of electropolished stainless steel that has been chemically vapor-deposited with hydrogenated amorphous silicon and further subjected to an inactivation treatment to bond an alkyl group. Further, the parts or portions that should suppress the scattering of the excitation light on the wall surface are treated with black-painted alumite on the satin finish of an aluminum alloy. The excitation light irradiation unit 3, the excitation light intensity detection unit 4, and the fluorescence detection unit 5 have a structure that prevents the entrance of indoor light, and the influence of the indoor light can be ignored. The excitation light intensity detection unit 4 uses a silicon photodiode as a detector, detects the light intensity of a part of the internally reflected light of the excitation light incident on the excitation light irradiation unit 3 from the continuous light source 2 as a current signal, and converts the current signal into a digital value proportional to the excitation light intensity using an A/D conversion circuit. The fluorescence detection unit 5 uses the photon counting head as a detector to detect fluorescence by a photon counting system. The generated pulse signal is counted by the gate counter circuit 8 during the gate pulse period set by the timing circuit 7. The gate pulse is applied until the continuous light source 2 is turned off after 2.9 µs has elapsed after the continuous light source 2 is turned on. The physical parameter information acquisition unit 9 measures the temperature and pressure of the sample gas in the fluorescent cell by a temperature measuring resistor and a semiconductor piezo resistance diffusion type pressure sensor, respectively, and branches part of the sample into a carbon dioxide measuring cell installed in parallel with the fluorescent cell to measure the carbon dioxide concentration and absolute humidity. The digital timing circuit 7 generates a rectangular wave pulse to be supplied to the rectangular wave modulation circuit 6, and also generates a gate pulse for signal processing in the gate counter circuit 8 by the same clock. The A/D conversion circuit of the excitation light intensity detection unit 4, the timing circuit 7, the gate counter circuit 8, the A/D conversion circuit of the physical parameter information acquisition unit 9, and the concentration calculator 10 are configured as an FPGA board on which an A/D conversion circuit, SSD, and a microcomputer are mounted. The calculation of the concentration C of the measurement target substance in the concentration calculator 10 is expressed by Equation (1) in which Ip is the current photon count value within the predetermined period obtained by the gate counter circuit 8, B is the current background photon count conversion value within the predetermined period, I is the current excitation light intensity, I0 is the reference excitation light intensity value during concentration calibration, fe is the excitation light intensity correction coefficient, If is the fluorescence photon count value, Ifd is the excitation light intensity corrected fluorescence photon count value, and a is the concentration coefficient during concentration reference calibration. The excitation light intensity correction coefficient fe is expressed by Equation (2). When the background photon counting conversion value B is calculated by the procedure 1, since the carbon dioxide concentration and absolute humidity of the exhaled breath are constant, and the temperature and pressure of the sample gas in the fluorescent cell are controlled, so they are treated as constant. The current background photon count conversion value B is obtained from Equations (3), (4) and (5), and the phenol concentration is calculated. Next, the method of calculating the background photon count conversion value B by the procedure 2 is adopted and compared with the case of the procedure 1. In the case of the procedure 2, the measurement values of the concentrations or molar fractions mni of nitrogen, oxygen, carbon dioxide, and water vapor in the exhaled breath, and the temperature Te and pressure Pe in the fluorescent cell are treated as fluctuating, and six (j=6) physical parameters are given, while four components of nitrogen, oxygen, carbon dioxide, and water vapor contribute to Rayleigh scattering. The molar fraction of nitrogen is treated as constant as a dry gas. The molar fraction of oxygen can be measured, for example, by a magnetic oxygen concentration sensor. The physical parameter normalization function NRi(Pj, Pj0) is determined by Equation (18) instead of Equation (9), the current background photon counting conversion value B is obtained by Equations (6), (7), and (8), and the phenol concentration is calculated.

[Math. 9]

$$NR_i(P_j, P_{j0}) = \frac{mn_i \cdot P_e \cdot T_{e0}}{mn_{i0} \cdot P_{e0} \cdot T_e} \tag{18}$$

For the purpose of separating and quantifying p-cresol, a continuous light source 2 having a center wavelength of 275 nm is installed together with a continuous light source 2 having a center wavelength of 265 nm. In this case, both continuous light sources 2 is modulated with a rectangular wave of 17 kHz, the continuous light source 2 having a central wavelength of 265 nm is turned on for 26.4 µs per cycle, and the continuous light source 2 having a central wavelength of 275 nm is turned on for 26.4 µs simultaneously with turning off the continuous light source 2 having the center frequency of 265 nm. The fluorescence detection unit 5 uses the same detector for both excitation light components, and counts the corresponding pulse signals in the gate counter circuit 8 of each continuous light source 2 by a separate gate pulse corresponding to the turn-on of each continuous light source 2. As in the case of one continuous light source 2, the gate pulse is applied until the continuous light source 2 is turned off after 2.9 µs has elapsed after the continuous light source 2 is turned on. The concentration calculator 10 calculates the background photon count conversion values of phenol and p-cresol according to the procedure 2. After calculating the excitation light intensity corrected fluorescence photon count values Ifd1 and Ifd2, the concentrations of phenol and p-cresol are obtained by solving the simultaneous equations of Equation (17).

A case where there is one continuous light source 2, that is, one-wavelength excitation, and the background photon count conversion value B is calculated by the procedure 1 (referred to as Embodiment 1 of present invention for convenience), a case of one-wavelength excitation where the background photon count conversion value B is calculated by the procedure 2 (referred to as Embodiment 2 of present invention for convenience), and a case of two-wavelength excitation where the background photon count conversion value B is calculated by the procedure 2 (referred to as Embodiment 3 of present invention for convenience) are compared with the prior art. In the prior art, the fourth harmonic of a semiconductor laser-excited Nd:YAG laser with a wavelength of 266 nm, a repetition frequency of 1 kHz, a pulse width of 10 ns, and a pulse energy of 0.2 mJ is used as a pulsed light source, and the generated fluorescence is detected by a current detection type photomultiplier tube through a bandpass filter having a center wavelength of 270 nm and a half-value bandwidth of 10 nm. The current signal is converted into a voltage through a pre-amplifier, gated, integrated with a boxcar integrator, and A/D converted, and taken into a personal computer. The semiconductor laser-excited Nd:YAG laser is oscillated by an external trigger generated by a digital delay pulse generator, and a pulse with a constant delay time is sent to the boxcar integrator and an integration gate is applied. In addition, a part of the excitation light is detected by a silicon photodiode, amplified as a current signal proportional to the excitation light intensity, integrated by a boxcar integrator, A/D converted, and taken into a personal computer to perform correction of the fluorescence signal intensity. A calibration curve is prepared in advance with a standard phenol gas having a predetermined concentration including zero gas, and the phenol concentration is calculated. A case where the integration gate is applied from the elapse of a delay time of 2 ns after the start of the actual pulsed light oscillation to 2 ns after the end of the pulsed light oscillation (referred to as Existing Technique 1 for convenience), and a case where the integration gate is applied from the elapse of 0.5 ns to 2 ns after the end of the pulsed light oscillation (referred to as Existing Technique 2 for convenience) are examined. The comparison results are shown in Table 1. Existing Technique 1, Existing Technique 2, Embodiment 1 of present invention, and Embodiment 2 of present invention are devices that measure the total concentration of phenol in the exhaled breath and p-cresol present in about 10% to 20% of the phenol in terms of phenol. Embodiment 3 of present invention is a device for separating phenol and p-cresol and measuring each concentration. In the table, the 1-second integrated zero noise indicates the RMS noise or standard deviation of the measured value of the 1-second integrated zero gas having a composition of 21.3 kPa of oxygen and 80.0 kPa of nitrogen. The minimum detection limit for 1-minute integration is defined by 3 times the standard deviation of the measured value for 1-second integration. Repeated producibility is evaluated as the relative standard deviation by repeatedly measuring one-minute integration ten times at intervals of about ten minutes by circulating a standard gas prepared so that the phenol concentration is 19.8 ppb and the p-cresol concentration is 19.6 ppb using a matrix having a composition of 14.4 kPa of oxygen, 71.1 kPa of nitrogen, 5.1 kPa of carbon dioxide, and 6.3 kPa of water vapor similar to that of human exhaled breath. The zero drift when changing the matrix refers to the amount of change in the measured value of one-minute integration when switching from a zero gas with the same composition of 21.3 kPa of oxygen and 80.0 kPa of nitrogen as when inhaling to a zero gas with the composition of 14.4 kPa of oxygen, 71.1 kPa of nitrogen, 5.1 kPa of carbon dioxide, and 6.3 kPa of water vapor similar to human exhalation.

TABLE 1

Effects of present invention

| State of fluorescence measuring device | Existing Technique 1 | Existing Technique 2 | Embodiment 1 of present invention | Embodiment 2 of present invention | Embodiment 3 of present invention |
|---|---|---|---|---|---|
| Principle name | Laser excitation fluorescence method | Laser excitation fluorescence method | LED induced fluorescence method | LED induced fluorescence method | Two-wavelength excitation LED induced fluorescence method |
| Method detail | Simultaneous integration gate | Delayed integration gate | Procedure 1 | Procedure 2 | Procedure 2 |
| Measurement target | Total concentration in terms of phenol concentration | Total concentration in terms of phenol concentration | Total concentration in terms of phenol concentration | Total concentration in terms of phenol concentration | Concentrations of phenol and p-cresol |
| Zero noise of one-second integration RMS (ppb) | 0.84 | 1.1 | 0.075 | 0.073 | 0.34 / 0.27 |
| Minimum detection limit 3 σ (ppb) of one-minute integration | 0.33 | 0.57 | 0.042 | 0.030 | 0.14 / 0.12 |
| Repeatability (% RSD) | 5.9 | 5.2 | 1.9 | 0.71 | 0.88 / 0.91 |

TABLE 1-continued

Effects of present invention

| State of fluorescence measuring device | Existing Technique 1 | Existing Technique 2 | Embodiment 1 of present invention | Embodiment 2 of present invention | Embodiment 3 of present invention |
|---|---|---|---|---|---|
| Zero drift (ppb) when changing matrix | 1.2 | 0.94 | 0.26 | 0.047 | 0.12<br>0.15 |

As shown in Table 1 above, all the embodiments of the present invention have higher accuracy and excellent reproducibility than the existing techniques. Further, when the background photon count conversion value is calculated by the procedure 2, if the concentration calibration for valuation is performed first, the same accuracy as above is maintained without calibration for 6 months or more. In the embodiment of the present invention, by making use of digital processing, the fluorescence measuring device 1 can be configured using an inexpensive LED, and the fluorescence measuring device 1 can be configured at low cost.

Example 2

As another example of the embodiment of the present invention shown in FIG. 1, a fluorescence measuring device 1 for intermittently or continuously analyzing boron in a liquid sample by a flow injection analysis method or a continuous flow analysis method using fluorescence measurement of a complex formed by chromotropic acid (1,8-dihydroxynaphthalene-3,6-disulphonic acid) and boric acid will be described. Conventionally, a fluorescence measuring device using chromotropic acid as a fluorescence reagent has existed, and it is well known that the analysis of boron in surface water can measure a concentration well below the environmental standard of 1 mg/L. However, since the background of fluorescence measurement is high, it is not possible to measure up to an extremely low concentration of 10 ng/L or less, which is required for ultrapure water control in a semiconductor process, and the application cannot be expanded. The height of the background in this case is mainly due to the autofluorescence of the chromotropic acid itself. Depending on the pH of the system, chromotropic acid dissociates two sulfone groups and then two hydroxyl groups to generate up to tetravalent anions. The absorption spectrum from the undissociated type to the divalent anion is a wide-band spectrum that is almost similar, but the absorption maximum shifts by a long wavelength according to the dissociation to the trivalent and tetravalent anions. For example, in the fluorescence spectrum excited at a wavelength of 316 nm, the fluorescence maximums of 352 nm and 369 nm in the acidic region disappear with an increase in pH, and the fluorescence maximum of 430 nm grows. Further, the complex of chromotropic acid and boric acid to be measured for fluorescence has a 1:1 complex and a 1:2 complex in molar ratio, and the formation proceeds to a 2:1 complex by a two-step reaction according to the pH of the system. The formation of the 1:1 complex in the first stage is a fast positive reaction, but the reaction to form the 1:2 complex from the 1:1 complex in the second stage is relatively slow, and the acid dissociation constant of the chromotropic acid ligand dominates the pH dependence of the complex formation equilibrium. The absorption spectra and fluorescence spectra of the 1:1 complex and the 1:2 complex are wide-band spectra similar to the original chromotropic acid, although the molar extinction coefficient and the fluorescence quantum yield are relatively large.

Therefore, as the fluorescence measuring device 1 for flow injection analysis of extremely-low concentration boron, since responsiveness is prioritized and the reaction time cannot be long, the pH of the system is set in the neutral to alkaline region where the progress to the 1:2 complex is suppressed and the 1:1 complex dominated. Moreover, in order to obtain the linearity of detection, the 1:1 complex is generated by a pseudo-first-order reaction with a large excess of chromotropic acid. At pH 7, chromotropic acid is mainly composed of trivalent anions, and the fluorescence intensity in the 352 nm band becomes small. First, ultrapure water is sent as carrier water at 0.5 mL/min by a first pump, and 300 µL of sample liquid is inserted into the middle of the carrier water flow path with a hexagonal valve. The second pump sends a 0.1 mol/L of sodium citrate buffer liquid with pH 7.0 at 0.5 mL/min, containing 0.0004 mol/L of chromotropic acid and 0.002 mol/L of ethylenediamine tetraacetic acid for eliminating the interference of metal ions. After sending the liquid and merging at a mixing section, 0.1 mol/L of ammonia water is sent at 0.5 mL/min with a third pump and merged at a downstream mixing section. The liquid components flow through a reaction coil and react to obtain a 1:1 complex of chromotropic acid and boric acid. The flow path is composed of a PTFE tube having an inner diameter of 0.5 mm. The temperature of the reaction coil and the flow path is controlled to 35° C. The excitation light irradiation unit 3 is a fluorescent flow cell made of synthetic quartz and having a capacity of 0.1 mL installed on the downstream side. The continuous light source 2 of the fluorescence measuring device 1 of this example is a deep ultraviolet LED having a center wavelength of 308 nm and an optical output of 50 mW. The wavelength band is further narrowed by a bandpass filter having a center wavelength of 310 nm and a full width at half maximum of 10 nm. The rectangular wave modulation circuit 6 generates a rectangular wave of 17 kHz which is repeatedly turned on for 75% of one cycle (that is, for 44.1 µs) and turned off for the remaining 25% (that is, 14.7 µs), which is used as the excitation light. The excitation light irradiation unit 3 is a fluorescent flow cell made of synthetic quartz and having a capacity of 0.1 mL installed on the downstream side of the reaction coil. In the fluorescent flow cell, the cross-section of the flow path is rectangular, three surfaces along the flow path are transparent, and the remaining one surface is opaque. The excitation light is incident perpendicularly to the flow path from one transparent surface, and the total amount of transmitted light of the excitation light on the opposing one surface is detected as a current signal by the excitation light intensity detection unit 4 using a silicon photodiode as a detector. The A/D conversion circuit converts it into a digital value proportional to the excitation light intensity. The fluorescence detection unit 5 is arranged on one surface orthogonal to the incident surface, a part of the fluorescence wavelength is cut out by a bandpass filter having a center wavelength of 355 nm and a full width at half maximum of 10 nm, and the fluorescence is detected by a photon counting system using a photon counting head as a detector. The generated pulse signal is counted by the gate counter circuit 8 during the gate pulse period set by the timing circuit 7. The gate pulse is applied until the continuous light source 2 is turned off after 2.9 µs has elapsed after the continuous light source 2 is turned on. The excitation light irradiation unit 3, the excitation light intensity detection unit 4, and the fluorescence detection unit 5 have a structure that prevents the entrance of indoor light, and the influence of the indoor light can be ignored. The pulse signal generated by the fluorescence detection unit 5 is counted by the gate counter circuit 8 during the gate pulse period set by the timing circuit 7. The gate pulse is applied until the elapse of 11.8 µs after the continuous light source 2 is turned off after 2.9 µs has elapsed after the continuous light source 2 is turned on. The physical parameter information acquisition unit 9 measures the temperature and pH of the reaction solution in the fluorescent flow cell by a temperature measuring resistor and a semiconductor pH sensor using an ion response field effect transistor (ISFET), respectively. The digital timing circuit 7 generates a rectangular wave pulse to be supplied to the rectangular wave modulation circuit 6, and also generates a gate pulse for signal processing in the gate counter circuit 8 by the same clock. The A/D conversion circuit of the excitation light intensity detection unit 4, the timing circuit 7, the gate counter circuit 8, the A/D conversion circuit of the physical parameter information acquisition unit 9, and the concentration calculator 10 are configured as an FPGA board on which an A/D conversion circuit, SSD, and a microcomputer are mounted. The background photon counting conversion value B of the 1:1 complex of chromotropic acid and boric acid in the concentration calculator 10 is calculated by the procedure 4, and the concentration of the 1:1 complex of chromotropic acid and boric acid, that is, the boron concentration, is calculated. Here, the excitation light scattering contribution term S cannot be ignored, but the Rayleigh scattering contribution term Ri can be ignored even if the band of the bandpass filter is taken into consideration because the detected fluorescence wavelength is significantly different from the excitation wavelength. On the other hand, the natural Raman scattering contribution term RMk is almost the contribution of Raman scattering 3,328 cm−1 of water, and it hangs on the skirt of the fluorescent wavelength band for detection, but the water concentration can be regarded as constant, so the physical parameter normalization function NRMk(Pj, Pj0) can be treated as 1. Regarding the autofluorescence contribution term AF, since chromotropic acid is supplied in a fixed amount and is supplied in a large excess with respect to boric acid, the concentration does not change before and after the reaction, and the concentration as the total amount of ions is considered to be constant. However, the fraction of ions at each valence fluctuates in response to the perturbation of the pH of the sample solution, and as a result, the contribution of autofluorescence fluctuates slightly. The effect of this pH is expressed by an exponential function and corrected. In addition, as for the concentration of the 1:1 complex of chromotropic acid and boric acid, because the complex formation reaction rate is slightly affected by the temperature and pH, these corrections are also incorporated by an exponential function. The concentration is calculated every 0.1 seconds using the photon counting integrated value for 0.1 seconds. After the elapse of dead time after receiving the contact signal for switching the hexagonal valve at the time of injecting the sample solution, the boron concentration of the sample solution is determined by integrating for three times the average residence time (4 seconds) in the fluorescent cell, that is, for 12 seconds.

According to the embodiment of the present invention, the boron concentration can be measured without being affected by the background of autofluorescence of chromotropic acid, and the minimum detection limit in one measurement of the sample solution achieves an extremely low concentration of 3.2 ppt. The reproducibility of ten repeated measurements with a 1-ppb standard boron solution is extremely as good as 1.1% RSD.

The invention claimed is:

1. A fluorescence measuring device comprising:
a continuous light source that generates excitation light of a measurement target substance;
an excitation light irradiation unit that introduces a sample and irradiates the excitation light from the continuous light source;
an excitation light intensity detection unit that detects the amount of light proportional to the excitation light intensity and converts the amount of light into a digital signal;
a fluorescence detection unit that detects fluorescence emitted by the measurement target substance by a photon counting system;
a rectangular wave modulation circuit that modulates the continuous light source with a rectangular wave corresponding to turn-on and turn-off states;
a timing circuit that generates a rectangular wave pulse to be supplied to the rectangular wave modulation circuit and a gate pulse;
a gate counter circuit that counts a pulse signal corresponding to one photon from the fluorescence detection unit during a period of the gate pulse within a predetermined period;
a physical parameter information acquisition unit that acquires a current physical parameter value required for calculating the concentration of the measurement target substance; and
a concentration calculator that subtracts a current background photon count conversion value from a current photon count value obtained from the gate counter circuit to obtain a fluorescence photon count value excluding the influence of background, divides the obtained fluorescence photon count value by an excitation light intensity correction coefficient represented as a ratio between a current excitation light intensity measurement value measured by the excitation light intensity detection unit and a reference excitation light intensity value measured during concentration calibration to calculate an excitation light intensity corrected fluorescence photon count value, and further divides the excitation light intensity corrected fluorescence photon count value by a concentration coefficient of the measurement target substance represented as a fluorescence photon count value per concentration obtained during the concentration calibration to digitally calculate the concentration of the measurement target substance,
wherein the background photon count conversion value in the concentration calculator is calculated using a reference background photon count value and a related reference physical parameter value measured with a sample that does not contain the measurement target substance during the concentration calibration stored in advance, the current physical parameter value acquired by the physical parameter information acquisition unit, and the excitation light intensity correction coefficient, assuming that the background photon count conversion value is a linear combination of a constant term that does not depend on the excitation light intensity correction coefficient and a proportional term that is proportional to the excitation light intensity correction coefficient.

2. The fluorescence measuring device according to claim 1,
wherein the continuous light source is an LED.

3. The fluorescence measuring device according to claim 1,
wherein the concentration calculator stores values of each term obtained during concentration calibration assuming that the reference background photon count value is composed of a sum of a constant term that does not depend on the reference excitation light intensity value, a reference excitation light scattering contribution term due to reflection and refraction at the excitation light irradiation unit, and a reference Rayleigh scattering contribution term due to a main component of a sample medium,
wherein the current background photon count conversion value is assumed to be composed of a sum of the constant term of the stored reference background photon count value, the current excitation light scattering contribution term that is proportional to the excitation light intensity correction coefficient, and the current Rayleigh scattering contribution term that is proportional to the excitation light intensity correction coefficient,
wherein the excitation light scattering contribution term is calculated using the stored reference excitation light scattering contribution term and the stored reference physical parameter value, and the current physical parameter value, and the excitation light intensity correction coefficient,
wherein the Rayleigh scattering contribution term is calculated using the stored reference Rayleigh scattering contribution term and the stored reference physical parameter value, and the current physical parameter value, and the excitation light intensity correction coefficient, and
wherein the fluorescence photon count value excluding the influence of the background is obtained.

4. The fluorescence measuring device according to claim 3,
wherein the concentration calculator stores values of each term obtained during concentration calibration as the terms of the reference background photon count value assuming that the reference background photon count value is composed of a sum of the terms obtained by adding a reference natural Raman scattering contribution term due to a component having Raman activity in the sample,
wherein the current background photon count conversion value is assumed to be a sum to which a current natural Raman scattering contribution term is further added,
wherein the natural Raman scattering contribution term is calculated using the stored reference natural Raman scattering contribution term and the stored reference physical parameter value, and the current physical parameter value, and the excitation light intensity correction coefficient, and
wherein the fluorescence photon count value excluding the influence of the background is obtained.

5. The fluorescence measuring device according to claim 3,
wherein the concentration calculator stores values of each term obtained during concentration calibration as the terms of the reference background photon count value assuming that the reference background photon count value is composed of a sum of terms to which a reference autofluorescence contribution term due to a sample is further added,
wherein a current background count conversion value is assumed to be a sum to which a current autofluorescence contribution term is further added,
wherein the autofluorescence contribution term is calculated using the stored reference autofluorescence contribution term and the stored reference physical parameter value, and the current physical parameter value, and the excitation light intensity correction coefficient, and
wherein the fluorescence photon count value excluding the influence of the background is obtained.

6. The fluorescence measuring device according to claim 1,
wherein the concentration calculator calculates the excitation light intensity corrected fluorescence photon count value by substituting with the non-quenching excitation light intensity corrected fluorescence photon count value obtained by a Stern-Volmer relational expression between a non-quenching excitation light intensity corrected fluorescence photon count value in the absence of a quenching substance, a concentration of the quenching substance, and a Stern-Volmer constant.

7. The fluorescence measuring device according to claim 1,
wherein the concentration calculator determines, in the concentration calculation, the concentration of each the measurement target substances by solving simultaneous equations assuming that a plurality of the excitation light intensity corrected fluorescence photon count values or a plurality of non-quenching excitation light intensity corrected fluorescence photon count values is a linear combination of the concentrations of the same number of measurement target substances and the same number of concentration coefficients.

* * * * *